(12) United States Patent
Johnson et al.

(10) Patent No.: US 7,289,145 B2
(45) Date of Patent: Oct. 30, 2007

(54) CORRELATED DOUBLE SAMPLING VARIABLE GAIN AMPLIFIER CIRCUIT FOR USE IN A DIGITAL CAMERA

(75) Inventors: Sandra Marie Johnson, Buda, TX (US); Shih-Chung Chao, Austin, TX (US); Nadi Rafik Itani, Austin, TX (US); Caiyi Wang, Austin, TX (US); Brannon Craig Harris, Austin, TX (US); Ash Prabala, Austin, TX (US); Douglas R. Holberg, Wimberley, TX (US); Alan Hansford, Austin, TX (US); Syed Khalid Azim, Fremont, CA (US); David R. Welland, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 11/415,000

(22) Filed: May 1, 2006

(65) Prior Publication Data

US 2006/0197847 A1     Sep. 7, 2006

Related U.S. Application Data

(62) Division of application No. 10/107,892, filed on Mar. 27, 2002, now abandoned, which is a division of application No. 09/075,382, filed on May 8, 1998, now abandoned.

(51) Int. Cl.
H04N 5/235     (2006.01)

(52) U.S. Cl. .................................. 348/229.1; 348/241

(58) Field of Classification Search ................ None
See application file for complete search history.

(56) References Cited

U.S. PATENT DOCUMENTS

| | | | |
|---|---|---|---|
| 5,708,263 A * | 1/1998 | Wong | 250/208.1 |
| 6,100,928 A | 8/2000 | Hata | 348/229.1 |
| 6,580,456 B1 | 6/2003 | Jacobs | 348/312 |
| 2005/0053352 A1 | 3/2005 | McKain et al. | 386/46 |

* cited by examiner

*Primary Examiner*—Vivek Srivastava
*Assistant Examiner*—Anthony J. Daniels
(74) *Attorney, Agent, or Firm*—Steven Lin

(57) ABSTRACT

An image processor system for a charge coupled device (CCD) or CMOS imaging system includes a correlated double sample and variable gain (CDSVGA) circuit for receiving data from a CCD system and an automatic gain control (AGC) circuit which first controls gain by adjusting said CCD system and then for yet a higher gain level makes gain adjustments in said CDSVGA circuit AND a digital gain circuit to produce a combined target gain level. A processing system for an imager device includes a camera system for producing an imager signal, a correlated double sample (CDS) circuit for receiving data from an imager, a variable gain amplifier (VGA), an analog-to-digital converter (ADC) coupled to said CDS circuit, a digital gain circuit (DGC) coupled to said ADC, and an automatic gain control (AGC) circuit coupled to said DGC for controlling the CDS circuit and the DGC. The processing circuitry includes an analog front end and a digital signal processing system for capturing full motion video and outputting a CCIR 601 4:2:2 YCrCb video data output for presentation on a user selected display.

12 Claims, 28 Drawing Sheets

$$\begin{bmatrix} Y \\ U \\ V \end{bmatrix} = \begin{bmatrix} K\_Ry & K\_Gy & K\_By \\ K\_Ru & K\_Gu & K\_Bu \\ K\_Rv & K\_Gv & K\_Bv \end{bmatrix} * \begin{bmatrix} R \\ G \\ B \end{bmatrix}$$

K_Ry = 0.299, K_Gy = 0.587, K_By = 0.114
K_Ru = -0.169, K_Gu = -0.331, K_Bu = 0.5
K_Rv = 0.5, K_Gv = -0.419, K_Bv = -0.081

GAMMA CORRECTION

HORIZONTAL SCALING

HORIZONTAL INTERPOLATION

CORRELATED DOUBLE SAMPLING VARIABLE GAIN AMPLIFIER CIRCUIT FOR USE IN A DIGITAL CAMERA

This application is a divisional of U.S. patent application Ser. No. 10/107,892 filed Mar. 27, 2002 now abandoned, which is a divisional of U.S. patent application Ser. No. 09/075,382 filed May 8, 1998, which is now abandoned.

CROSS REFERENCE TO RELATED APPLICATIONS

This application is related to patent application Ser. Nos. 09/075,491, 09/075,449, 09/075,506, 09/075,446, and 09/075,348, respectively entitled "Digital Camera Signal Processor and Method" having inventors Syed Khalid Azim, Shih-Chung Chao, Brannon Craig Harris, and Ash Prabala; "High Voltage Input Pad System and Method" having inventors Douglas R. Holberg, Nadi Rafik Itani, and David R. Welland; "Pipelined Analog-to-Digital Converter (ADC) Systems. Methods, and Computer Program Products" having inventors Sandra Marie Johnson and David R. Welland; "Histogram-Based Automatic Gain Control Method and System for Video Applications" having inventors Nadi Rafik Itani, Caiyi Wang, and David R. Welland; and "Selectable Threshold Multimode Gain Control Apparatus and Method for Setting Mutually Continuous Analog. Digital, and Shutter Gain Levels" having inventors Nadi Rafik Itani, Caiyi Wang, and David R. Welland; each of these applications filed on even date herewith and incorporated herein by reference in their entirety.

BACKGROUND OF THE INVENTION

This invention relates to analog and digital processors and methods, and more particularly to processing of full motion video derived from charge coupled device (CCD) cameras and CMOS imagers.

FIELD OF THE INVENTION

Charge coupled device (CCD) cameras are configured to capture full motion video according to many different CCD output formats and pixel rates. One such CCD camera includes a sensor array, a high voltage CCD driver for driving the sensor array, and a DC-DC converter. Such a camera produces a four-color mosaic CCD output, including a stream of cyan, magenta, yellow, and green color samples in various combinations.

These color samples are unfortunately not in a format which can directly be interpreted as images by a viewer using a display. In particular, the color samples are output from the CCD display in analog form representative of pixel information. Many conventional displays require a digital input representative of the image content to be displayed. Therefore, there is a need for a processor to convert the four-color mosaic CCD output into digital formatted data to enable user controlled hardware or software data processing leading to production of viewable digital images.

There is a further need for modularization of analog and digital subsystems that convert analog data into intermediate digital and final display-ready digital forms.

There is a further need to separately control gain over the analog and digital subsystems.

SUMMARY OF THE INVENTION

According to the present invention, a processing system for an imager device includes a camera system for producing an imager signal, a correlated double sample (CDS) circuit for receiving data from an imager, a variable gain amplifier (VGA), an analog-to-digital converter (ADC) coupled to said CDS circuit, a digital gain circuit (DGC) coupled to said ADC, and an automatic gain control (AGC) circuit coupled to said DGC for controlling the VGA circuit and said DGC.

According to one embodiment of the present invention, a correlated double sampler and variable gain amplifier (CDS-VGA) circuit for receiving CCD data, includes a first fixed capacitor for receiving CCD data, and a first amplifier connected to the first fixed capacitor for amplifying CCD data. The first amplifier is connected to the first fixed capacitor, a first variable capacitor connected in parallel with said first amplifier, and a first switch connect in parallel with said first variable capacitor. The first switch is clocked at a first clock phase. The CDSVGA according to one embodiment of the present invention further includes a second variable capacitor connected to the first amplifier, a second amplifier connected to the second variable amplifier, a second fixed capacitor connected in parallel with the second amplifier, and a second switch connected in parallel with the second fixed amplifier. The second switch is clocked at a second clock phase.

According to one embodiment of the invention, a distributed gain control circuit (DGCC) includes an imager signal source, a timing circuit for controlling the production of signals to the imager signal source, an amplifier system for receiving imager signals from the imager signal source, an analog to digital converter connected to the amplifier for receiving an amplified imager signal stream from the amplifier and converting the amplified imager signal stream into digital form, a digital gain circuit connected to said analog to digital converter, and an automatic gain control (AGC) circuit for receiving an output digital level from the digital gain circuit for controlling the gain of the amplifier system and the digital gain circuit subject to a predetermined gain function (PGF).

According to one embodiment of the present invention, a signal processing system (SPS) on an integrated substrate for a video camera includes analog front-end (AFE) circuitry, and digital signal processing system (DSPS) circuitry connected to the analog front-end (AFE) circuitry.

According to the present invention, a signal processing system (SPS) for an imager device includes a camera system for producing an imager signal, a correlated double sample (CDS) circuit for receiving data from an imager, a variable gain amplifier (VGA), an analog-to-digital converter (ADC) coupled to the VGA circuit, a digital gain circuit (DGC) coupled to the ADC, and an automatic gain control (AGC) circuit for controlling the VGA circuit and the DGC.

According to the present invention, gain control of a signal processing system for an imager device includes a correlated double sampler, and variable gain amplifier circuit (CDSVGA) for receiving data from the imaging system, and an automatic gain control (AGC) circuit for controlling the level of gain provided to the camera system according to the present invention.

According to the present invention, signal processing circuitry for a video camera has first and second data processing subsystems including an analog front-end (AFE) and a digital signal processing system (DSPS) connected to the analog front-end (AFE). The signal processing system according to the present invention performs signal processing functions for a low cost CCD or CMOS imaging camera capable of capturing full motion video. A complete digital video camera according to one embodiment of the present invention includes in part a sensor array, a high voltage CCD driver, a DC-DC converter, the AFE and the DSPS. The AFE data processing subsystem according to the present invention receives a mosaic CCD output (a stream combining cyan, magenta, yellow and green color samples) from the CCD camera, performs analog signal processing, and produces a digital output which can be converted to a form suitable for image display. The DSPS data processing subsystem according to the present invention accepts the digital output of the AFE data processing subsystem, performs digital processing on the received digital output of the AFE, and according to one embodiment of the present invention outputs a CCIR 601 4:2:2 YCrCb video data product suitable for presentation on a user selected display.

The AFE and DSPS data processing subsystems can be implemented as a cooperative chipset according to the present invention. The respective data processing subsystems include registers which are configured according to the present invention to share a common address space of the respective subsystems. To an external controller, the combined AFE and DSPS subsystems are operable as a unitary data processing system. Additionally, the separate AFE and the DSPS of the respective subsystems according to the present invention can be used as stand-alone units which can be addressed and controlled directly through respective I2C interfaces.

The SPS according to the present invention is thus partitionable into physically separate subsystems which can individually be fabricated on separate semiconductor substrates to enable the combined installation of the AFE and its analog functions in an integrated camera package jointly operable with an imager. This enables digital data processing to be accomplished either in the camera package itself or separately in a personal computer or other data processing system. This processing transforms the digital analog pixel samples into display-ready digital data format. Accordingly, digital and analog signal processing functions are adaptively localizable and delocalizable in accordance with application package requirements. By establishing distributable analog and digital functionalities, the entire imager signal processing functionality can be localized and fabricated in silicon. Alternatively, the analog functions can be fabricated in silicon while the digital functions are software implemented. The development of separate analog and digital modules accordingly permits convenient system retrofitting with advanced analog or digital designs. Further, the analog and digital subsystems are operable at different data rates. Thus, the output of an analog to digital (A/D) converter within the AFE subsystem can be 2× lower than the 4:2:2 YCrCb format output from the digital section according to one embodiment of the present invention. By partitioning the subsystems into separate modules, the data transmitted from the analog module subsystem to the digital module subsystem can be provided at a reduced interfacing load between the analog and digital signal processing domains creating processing efficiencies. According to the present invention, the AFE subsystem provides an imager interface which is scalable for a plurality of selected imager output formats and pixel rates. In particular, the timing signals and clocks such as horizontal and vertical shift register clocks, the applicable imager output sampling pulses, and the number of horizontal and vertical pixels per frame are user programmable according to the present invention.

Further according to the present invention, independent and dependent (through the DSPS) register addressing is enabled and timing generator parameters are programmable. An automatic gain control circuit allows for up to 98 dB of gain range including shutter exposure with an option for flickerless operation that is enabled with a hysteresis method according to the present invention.

DETAILED DESCRIPTION OF THE PREFERRED EMBODIMENTS

Figure 1:
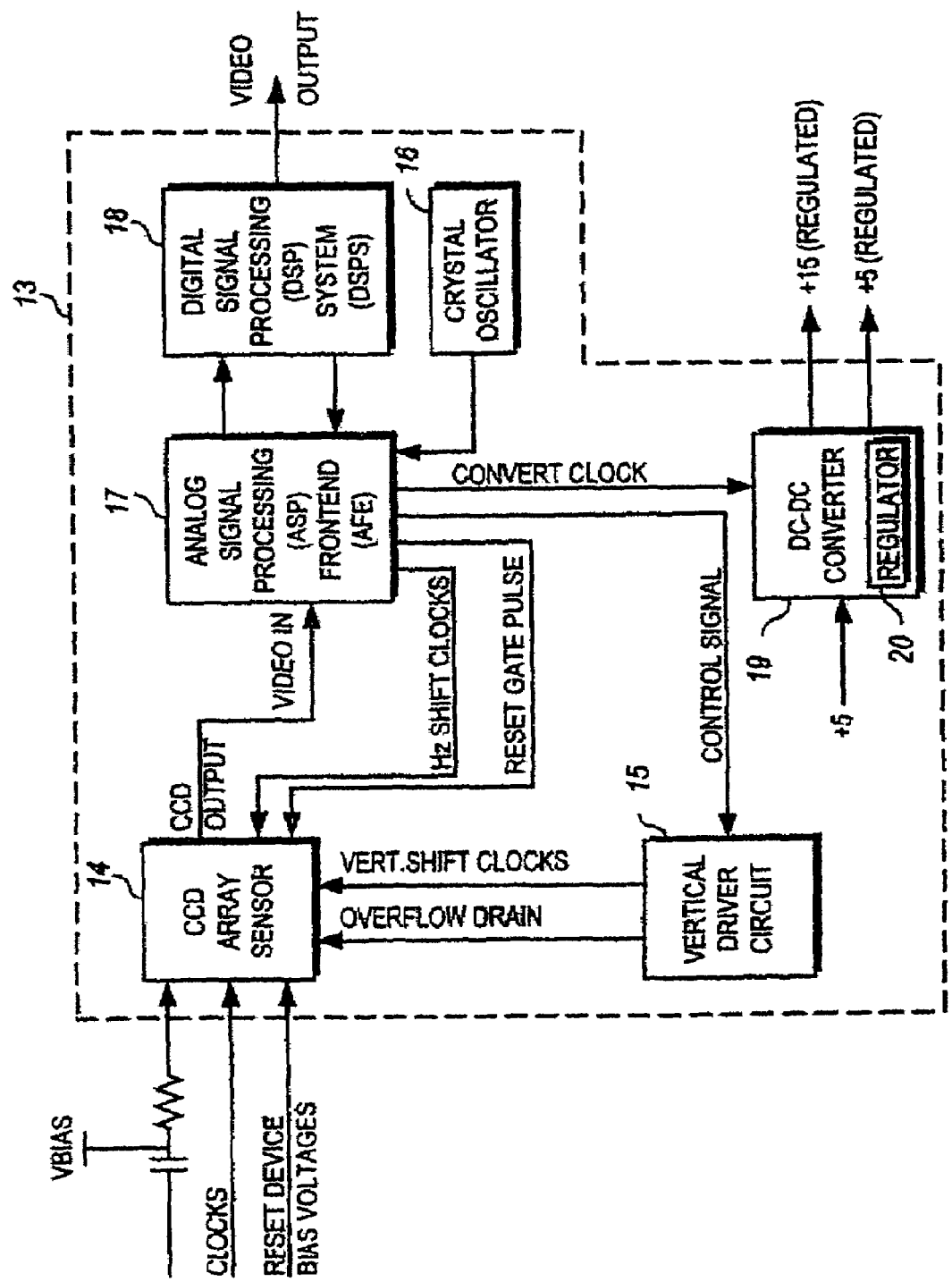
FIG. 1 is a block diagram of a CCD camera system according to the present invention.

As shown in FIG. 1, a video camera system (VCS) 13 according to the present invention includes the following integrated circuit (IC) components: a CCD array sensor 14, a vertical driver circuit 15 for the video camera system 13, a crystal oscillator 16, first and second signal processing subsystems (SPS) 17 and 18, and a DC to DC converter 19 including a regulator 20. First SPS 17 is an analog signal processing (ASP) front end (AFE) which receives and processes video samples from the sensor 14 and generates timing clocks and pulses required by the first and second SPSs 17 and 18, the sensor 14, the DC to DC converter 19, and vertical driver circuit 15. The vertical driver is circuit 15 generates high voltage vertical shift register clock signals and an overflow drain bias voltage provided to CCD array sensor 14. The video output of the sensor 14 is directly connected to the input of the first SPS 17. DC to DC converter 19 receives unregulated 5 volts DC and produces first and second regulated output voltages at 5 and 15 volts, subject to a clock signal received from the first signal processing subsystem 17. First signal processing subsystem 17 produces a control signal provided to said vertical driver circuit 15. CCD array sensor 14 receives an input voltage bias signal, input clock signals, and reset device bias voltages.

Camera frame formats, according to the present invention, are subject to a user selected CCD format for data input to first SPS 17 and an output video frame format produced by second SPS 18. CCDs, according to the present invention, include interlaced odd and even frame format cameras, each containing half the vertical lines, as well as progressive scan CCD cameras. According to particular embodiments of the present invention, a variety of frame formats can be used.

According to one embodiment of the present invention, the horizontal CCD line time can be set at 63.5 microsecond, and the pixel clock frequency can be set to match the number of horizontal pixels produced by a selected CCD. For instance, for a 512×492 CCD producing 624 total pixels/line, a clock frequency of 9.82 can be set. According to the present invention, scaling and interpolation of frames from CCD array sensor 14, which would increase frame size, is avoided. Such scaling increases bandwidth undesirably. Scaling according to the present invention is left to the user's selected destination hardware, where scaling can be tailored to match consumer requirements. Further, according to the present invention, manipulation of video data to match particular format and refresh rate requirements of target displays is avoided at the camera, except for interpolation of the 512 active pixels/line to 640 active pixels/line for existing camera compatibility, which is implemented in the configuration of the second SPS 18 as detailed below. In particular, the first SPS 17 is configured, according to the present invention, to produce an unscaled analog output video signal. According to one embodiment of the present invention, the first SPS 17 is configured to produce a generalized digital representation of the analog output video signal which is independent of the specific format requirements of a target display. Further, according to one embodiment of the present invention, the first SPS 17 is configured to produce a generalized output video signal which is independent of the refresh requirements of a target display. Further, according to one embodiment of the present invention, the second SPS 118 is configured to produce an unscaled digital output video signal. Further, according to one embodiment of the present invention, the second SPS 18 is configured to produce a generalized digital output video signal which is independent of the specific format requirements of a target display. Further, according to one embodiment of the present invention, the second SPS 18 output video signal which is independent of the refresh requirements of a target display.

Data is formatted according to the present invention to accommodate multiple selected transmission channel requirements by producing a generalized output digital video signal. According to one embodiment of the present invention, first or second digital video outputs are selectable: first, a 4:2:2 YCrCb output multiplexed onto a 10 bit bus at twice the pixel sampling rate; and second, 20 bit parallel Y and CrCb outputs provided at a user selected pixel rate.

Figure 2:
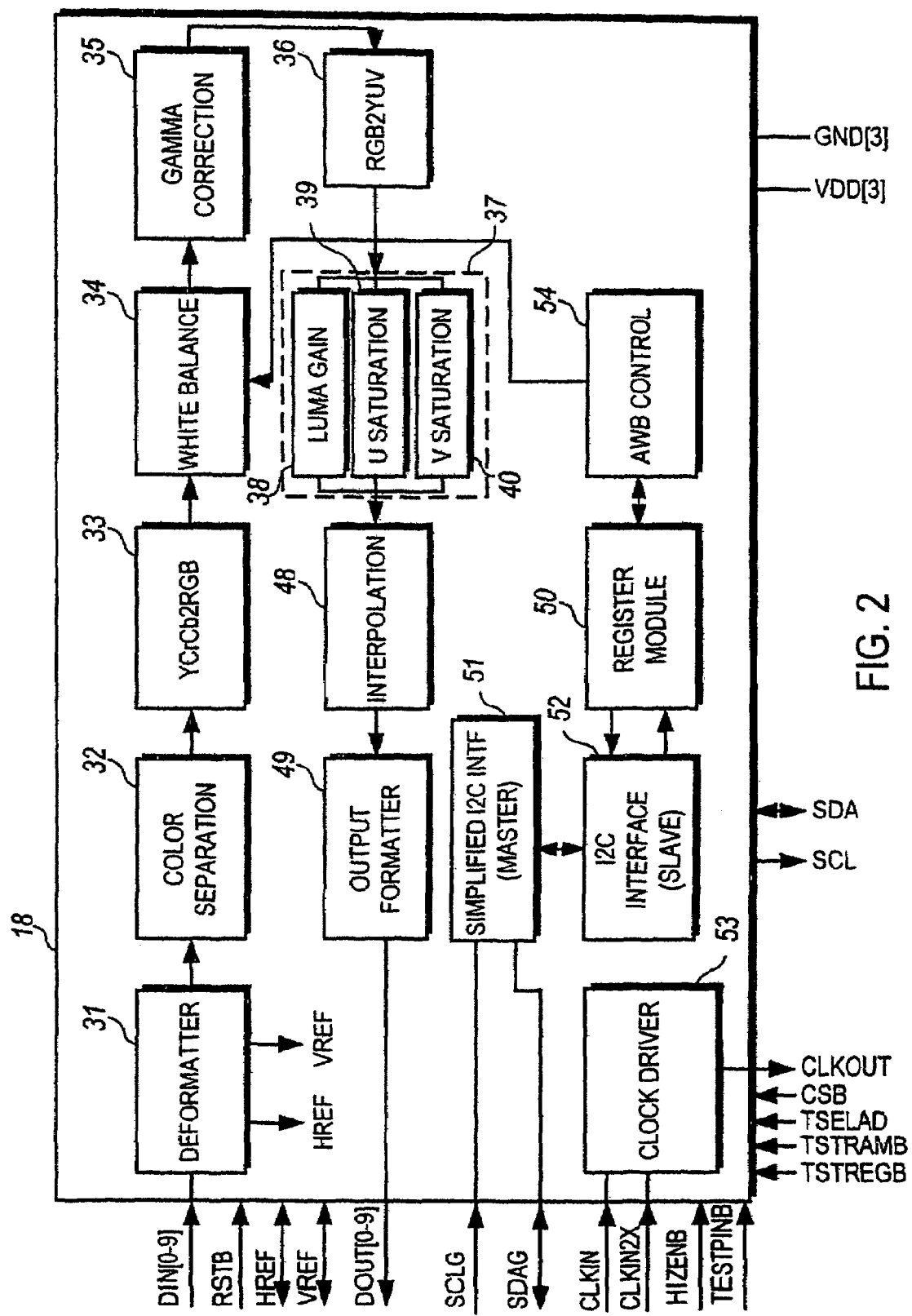
FIG. 2 is a block diagram of a digital signal processing (DSP) system according to the present invention.

A block diagram of a signal processing system, a digital signal processing system (DSPS) 18, according to one embodiment to the present invention, is shown in FIG. 2. DSPS 18 in particular includes a deformatter 31, a color separation module 32, a YCrCb to RGB converter 33, a white balance module 34, gamma correction module 35, an RGB to YUV converter 36, a color saturation circuit 37, an interpolation module 48, and an output formatter module 49. DSPS 18 further includes an AWB control module 54, a register module 50, a simplified I2C interface master module 51, a I2C interface slave module 52, and a clock driver 53. Color saturation module 37 includes a luma gain module 38, a U saturation module 39, and a V saturation module 40. According to the present invention, deformatter 31 is coupled to color separation and filter module 32 which in turn is connected to YCrCb to RGB (YR) converter 33. YR converter 33 is connected to white balance module 34 which in turn is connected to gamma correction module 35. White balance module 34 is controlled by AWB module 54. Gamma correction module 35 is connected to RGB to YUV (RY) module 36 which in turn is connected to color satu- VREF signals are also made available on output pins from DSPS 30. The color separation and filter block circuit 32 accepts input data from deformatter 31 and generates luma samples and chroma difference samples therefrom. Each input sample color separation and filter module 32 represents a pair of complementary color pixels, as shown below. The order of red and blue lines and the color of the first pixel is programmable according to the present invention. The following respective tables, i.e., Table 1 and Table 2 provide odd and even field examples for the successive generation of red and blue lines according to one embodiment of the present invention.

TABLE 1

EVEN FIELD

| | Sample | | | | | |
|---|---|---|---|---|---|---|
| | 0 | 1 | 2 | 3 | 4 | . |
| Hz line #0 | Mg + Ye | G + Cy | Mg + Ye | G + Cy | Mg + Ye | . Generates RED color difference |
| Hz line #1 | G + Ye | MG + Cy | G + Ye | Mg + Cy | G + Ye | . Generates BLUE color difference |
| . . . | | | | | | |

TABLE 2

ODD FIELD

| | Sample | | | | | |
|---|---|---|---|---|---|---|
| | 0 | 1 | 2 | 3 | 4 | . |
| Hz line #0 | Ye + G | Cy + Mg | Ye + G | Cy + Mg | Ye + G | . Generates BLUE color difference |
| Hz line #1 | Ye + Mg | Cy + G | Ye + Mg | Cy + G | Ye + Mg | . Generates RED color difference |
| . . . | | | | | | | ration module 37. The U and V components received from RGB to YUV module 36 are multiplied by user-programmable coefficient values. These values are written into respective blue saturation (for U) and the red saturation (for V) registers. These respective values can vary from 0 to 2. The luma gain value is written into the luma gain register 38. The gain can vary, according to the present invention, from 0 to 3⅛ using the four lsb bits in increments of ⅛. Color saturation module 37 is connected to interpolation module 48 which in turn is connected to output formatter module 49. Simplified I2C interface master module 51 is connected to I2C interface slave module 52. Register module 50 is connected to both I2C interface slave module 52 and AWB control module 54. DSPS 30 accepts a digital output from a first signal processing system (SPS), performs selected digital signal processing according to the present invention, as will be discussed in detail below, and outputs a 10 bit 4:2:2 YCrCb data block, according to one embodiment. Input data (DIN) is first processed by deformatter 31, which is effective for extracting HREF and VREF signals from the input data, according to one embodiment of the present invention and also for subtracting therefrom the black level code. The resulting data output from deformatter 31 is provided to color separation circuit 32. The HREF and The functions performed by the color separation and filter block 32 further include generation of luma samples; the generation of chroma samples; and the performance of luma filtering. In particular, luma samples are generated by color separation and filter module 32 by determining the sum of a current input and a next input sample, i.e., $Y(I)=x(I)+x(I+1)$. This produces for a first sample, $Y(O)=(Mg+Ye)+(G+Cy)=3G+2R+2B$. Other samples result in the same mix of R, G, and B. Chroma color difference samples are generated according to the present invention by subtracting two consecutive input samples. Each video line provides only one color difference sample (either red or blue). Absent color difference samples on each line are provided by copying the previous line of color difference samples. Examples of color difference calculations are:

$Crd(0)$ for line 0 of even field=$(Mg+Ye)_{[0]}-(G+Cy)_{[1]}=2R-G$;

$Crd(1)$ for line 0 of even field=$(Mg+Ye)_{[2]}-(G+Cy)_{[1]}=2R-G$; and $Cbd(0)$ for line 1 of even field=$(Mg+Cy)_{[1]}-(G+Ye)_{[0]}=2B-G$.

The first red color difference on a selected line is generated by subtracting a next sample from a current sample, and the blue color difference is generated by subtracting a current sample from a next sample. Luma samples are processed with a high pass filter with a peaked high frequency response.

A pin diagram of an analog image processor system (AIPS) 103 serving as an analog front end (AFE) in accordance with one embodiment of the present invention calls for AIPS 103 receiving image data at pin 17 according to one embodiment of the present invention. Data output is provided from AIPS 103 on pins 1-3, 35-38, and 42-44. Additional pins and functions of AIPS 103 are detailed in Table 3 which follows:

TABLE 3

PIN LIST FOR ANALOG IMAGE PROCESSOR SYSTEM

| Seq. No. | Pin Name | Pin Type | Interface Type | Description of Function |
|---|---|---|---|---|
| 1 | DOUT7 | O | CMOS 12 mA | This pin provides a digitized mosaic data output. |
| 2 | DOUT8 | O | CMOS 12 mA | This pin provides a digitized mosaic data output. |
| 3 | DOUT9 | O | CMOS 12 mA | This pin provides a digitized mosaic data output. |
| 4 | CLKO | O | CMOS 12 mA | This pin provides a data clock output. |
| 5 | VDDD | | Supply | This pin provides a supply for digital components. |
| 6 | GNDD | | Ground | This pin provides a ground for digital components |
| 7 | HSYNC | O | CMOS 4 mA | This pin provides a horizontal sync signal. |
| 8 | SDA | B | N-CH O.D. | This pin provides a I2C data pin (bidirectional). |
| 9 | SCL | I | CMOS | This pin provides a I2C bus control. |
| 10 | VRST | I | CMOS | Vertical sync reset. |
| 11 | INTERP | I | CMOS | Interpolate mode pin |
| 12 | DIAG0 | B | CMOS analog | Analog test I/O |
| 13 | DIAG1/ F_CLKIN | B | CMOS analog | Analog test I/O freq. of input clock |
| 14 | RST | I | CMOS | Reset pin; may be connected to external power-on-reset-circuit |
| 15 | SEAL_SUB | | Analog substrate | |
| 16 | ACSUB | | Analog substrate | |
| 17 | AIN | I | CMOS analog input | Video data input from CCD |
| 18 | GNDAC | | Ground | Ground for analog |
| 19 | VDDAC | | Supply | Supply for analog |
| 20 | FR | I/O | CMOS 8 mA | Reset gate clock pulse for CCD |
| 21 | VDDAM | | Supply | Supply for analog |
| 22 | GNDAM | | Ground | Ground for analog |
| 23 | H1 | I/O | CMOS 28 mA | Horizontal shift reg clock to CCD |
| 24 | H2 | I/O | CMOS 28 mA | Horizontal shift reg clock to CCD |
| 25 | V4X | I/O | CMOS 4 mA | Vertical shift register clock to V-driver |
| 26 | VH3X | I/O | CMOS 4 mA | Charge read pulse to V-driver |
| 27 | V3X | I/O | CMOS 4 mA | Vertical shift register clock to V-driver |
| 28 | VH1X | I/O | CMOS 4 mA | Charge read pulse to V-driver |
| 29 | V1X | I/O | CMOS 4 mA | Vertical shift register clock to V-driver |
| 30 | V2X | I/O | CMOS 4 mA | Vertical shift register clock to V-driver |
| 31 | OFDX | O | CMOS 4 mA | Charge sweep out pulse for shutter control-input to vertical driver |
| 32 | XTAL_IN | I | CMOS | Chip input clock-2 × pixel clock |
| 33 | XTAL_OUT | O | CMOS | Oscillator output to crystal |
| 34 | VCLK | I/O | N-CH O.D. 4 mA | Hz line freq. open-drain clock output |
| 35 | DOUT0 | O | CMOS 12 mA | Digitized mosaic data output, LSB |
| 36 | DOUT1 | O | CMOS 12 mA | Digitized mosaic data output |
| 37 | DOUT2 | O | CMOS 12 mA | Digitized mosaic data output |
| 38 | DOUT3 | O | CMOS 12 mA | Digitized mosaic data output |
| 39 | CLK2XO | I/O | CMOS 12 mA | 2 × pixel clock or 2 * 5/4 pixel clock (when interpolation is turned on) |

TABLE 3-continued

PIN LIST FOR ANALOG IMAGE PROCESSOR SYSTEM

| Seq. No. | Pin Name | Pin Type | Interface Type | Description of Function |
|---|---|---|---|---|
| 40 | GND_CORE | Ground | Ground for pad ring 1 | Ground for pad ring1 |
| 41 | VDD_CORE | Supply | Supply for pad ring1 | Supply for pad ring1 |
| 42 | DOUT4 | O | CMOS 12 mA | Digitized mosaic data output |
| 43 | DOUT5 | O | CMOS 12 mA | Digitized mosaic data output |
| 44 | DOUT6 | O | CMOS 12 mA | Digitized mosaic data output |

Figure 3:
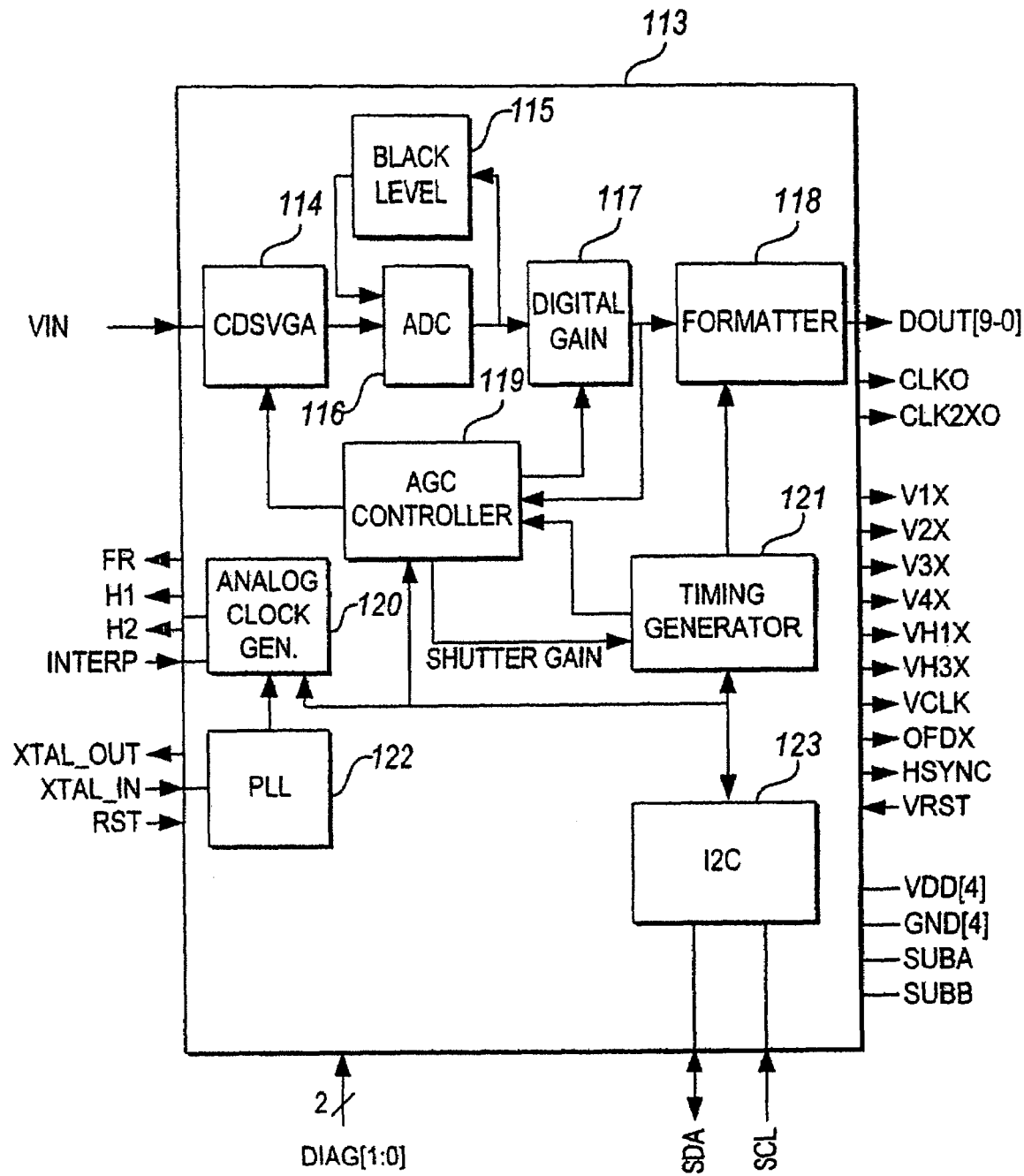
FIG. 3 is a block diagram of an analog data processing subsystem in accordance with one embodiment of the present invention.

FIG. 3 is a block diagram of an analog image processor subsystem (AIPS) 113, referred to generally as an analog front end (AFE) in accordance with one embodiment of the present invention. AIPS 13 includes correlated double sampler and variable gain amplifier (CDSVGA) circuit 114 receiving data in the form of an input voltage (VIN) from an image acquisition device (or imager), such as are conventionally known, an analog-to-digital converter (ADC) 116 connected to CDSVGA circuit 114, a black level adjustment circuit (BLAC) 115 feeding back to the ADC 116 input, a digital gain circuit 117, a formatter circuit 118, and an AGC controller circuit 119 for controlling CDSVGA circuit 114 and digital gain circuit 117. Digital gai/n circuit 117 is connected at its input to ADC 116 and at its output to formatter 118. AIPS 113 additionally includes an analog clock generator circuit 120, a timing generator circuit 121, a phase lock loop (PLL) circuit 122, and an I2C bus interface circuit 123. AGC controller circuit 119 controls digital gain circuit 117 and CDSVGA circuit 114 and timing for OFD pulses (shutter gain). PLL circuit 122 contributes to control of analog clock generator circuit 120. Timing generator circuit 121 provides timing signals to formatter circuit 118.

Correlated double sampler and variable gain amplifier circuit 114 parameters according to the present invention are expressed in Table 4 as follows:

TABLE 4

CDSVGA PARAMETERS

| Symbol | Parameter | Conditions | Min | Typ | Max | Units |
|---|---|---|---|---|---|---|
| $Vin_{VGA}$ | Input Voltage Range | | | | 1.65 | $V_{0-p}$ |
| $Vout_{VGA}$ | Output Voltage Range | | | 1.65 | | $V_{0-p}$ |
| $A_{VGA}$ | Total Gain | Minimum Setting | | 0 | | dB |
| $A_{VGA}$ | Total Gain | Maximum Setting | | 20 | | dB |
| $\tau_{SS}$ | Setting Time with 9 bits of resolution | Sampling for both stages | | | 17 | ns |
| $\tau_{SS}$ | Setting Time with 9 bits of resolution | Clearing for both stages | | | 17 | ns |
| $Vn_{VGA}$ | Input Referred Noise (rms) | Maximum Gain Setting | | | 0.2 | mV |
| $A_{step}$ | Gain Step | Over Full Gain Range | 39.2 | 78.4 | 117.6 | mdB |
| $PW_{VGA}$ | Power Dissipation | | | 78 | | mW |

Figure 4:
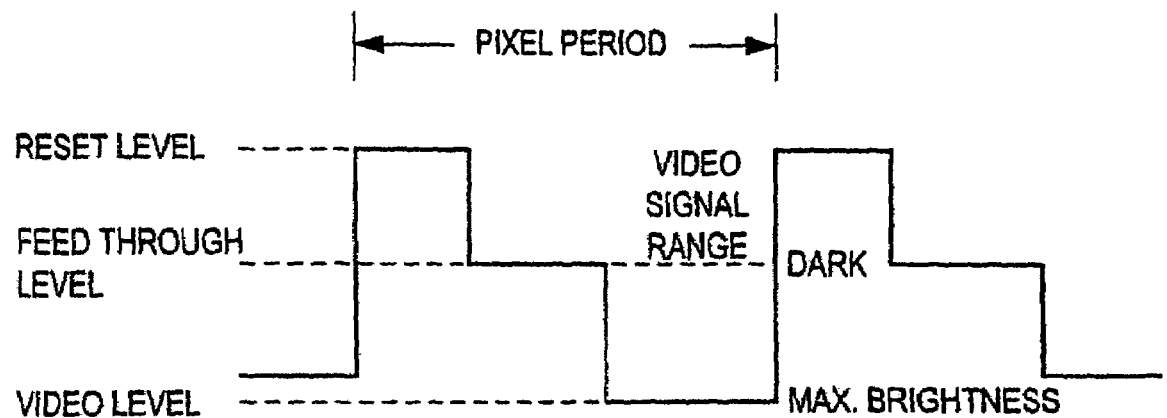
FIG. 4 is a diagram of a common output waveform of a selected imager, which is processed by an analog data processing subsystem in accordance with one embodiment of the present invention.

Referring now to FIG. 4, there is shown a diagram of a common output waveform of a selected image used in connection with the present invention. Correlated double sampling according to the present invention is accomplished by receiving imager output data including reset noise, thermal noise, and 1/f noise, which are generated by the imager. The noise received degrades the S/N ratio and is canceled by correlated double sampling according to the present invention. Noise received during the active video portion of the CCD signal is assumed to be correlated with the noise originating during the feed-through portion of the signal. This noise is canceled by subtracting the feed-through level from the video level with correlated double sampling according to the present invention. The active video signal is the difference between feed-through and video levels according to the present invention. The active video signal varies according to light conditions. In order to insure that the full dynamic range of the ADC 116 is utilized even under low light conditions, the imager output is amplified using a variable gain amplifier (VGA). Gain levels are controlled, according to one embodiment of the present invention, by an 8 bit control word. CDSVGA circuit 114 according to the present invention includes first and second stages, each having a gain range of 0-10 dB. Thus, a total gain range of both stages of 0-20 dB is accomplished according to one embodiment of the present invention.

Figure 5:
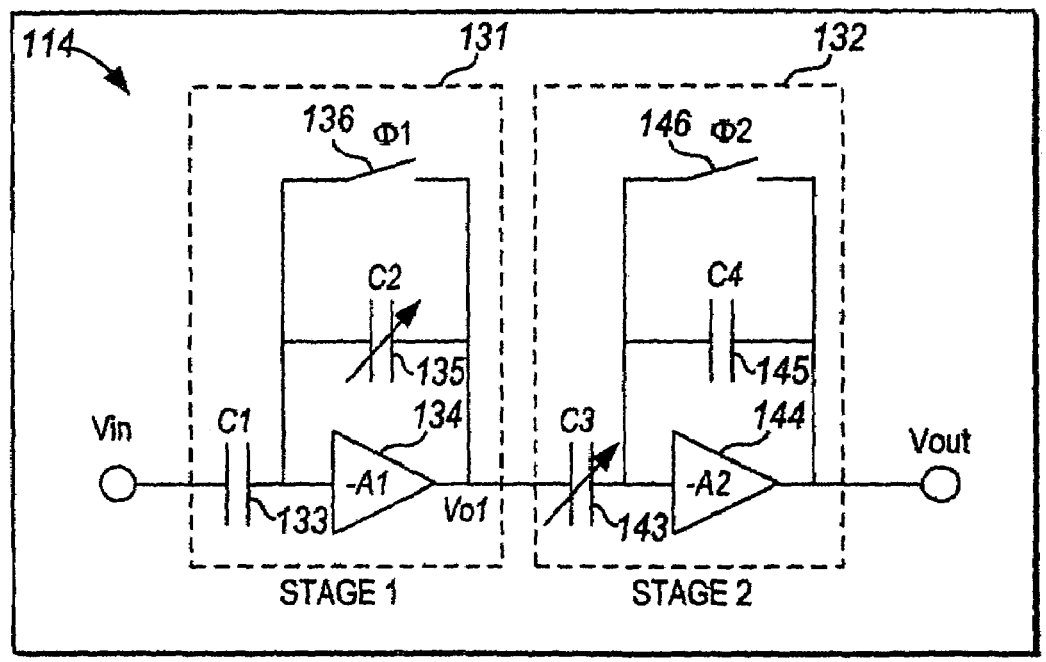
FIG. 5 is a block diagram of a correlated double sampling variable gain amplifier (CDS/VGA) for an analog data processing subsystem according to the present invention.

Referring now to FIG. 5, there is shown a block diagram of first and second CDSVGA circuit stages according to the present invention. CDSVGA circuit 114 particularly includes first and second respective stages 131 and 132 according to one embodiment of the present invention. First stage 131 includes a first capacitor C1, 133, which is fixed; a first amplifier 134 connected to first capacitor 133; a variable capacitor 135 in parallel with first amplifier 134; and a first switch 136 alternating between open and closed states in accordance with a clock φ1 in parallel with first amplifier 134. Second stage 132 includes a variable capacitor C3, 143 connected to the output of first amplifier 134; a second amplifier 144 connected to variable capacitor 143; a second fixed capacitor C4, 145 in parallel with second amplifier 144; and a second switch 146 alternating between open and closed states in accordance with a clock φ2. Second switch 146 is connected in parallel with second fixed capacitor 145. The total gain of the CDSVGA circuit 114 according to the present invention is A=(C1/C4)*(C3/C2) and is adjustable according to the present invention by varying C2 and C3. CDSVGA circuit 114 according to the present invention uses a two phase non-overlapping clock to perform the indicated CDS functions. The two phase clock according to the present invention also allows video signals to be passed to the output while maintaining a positive polarity signal. First stage 131 performs correlated double sampling CDS as follows. When clock φ1 is high, the feed-through level is sampled across first capacitor C1, and the output of the first stage is forced to a predetermined reference voltage level. When clock φ1 falls, the output voltage Vo1 of first amplifier 134 follows the input gain up by −C1/C2 so that when the video level arrives, this output will be at (Vvid−Vft)*(−C1/C2) above the reference voltage. Second stage 132 operates similarly, except that its switch is controlled by the second phase of the two phase non-overlapping clock. This adds a half clock delay, which is effective to maintain a positive output voltage with respect to the reference level.

Figure 6:
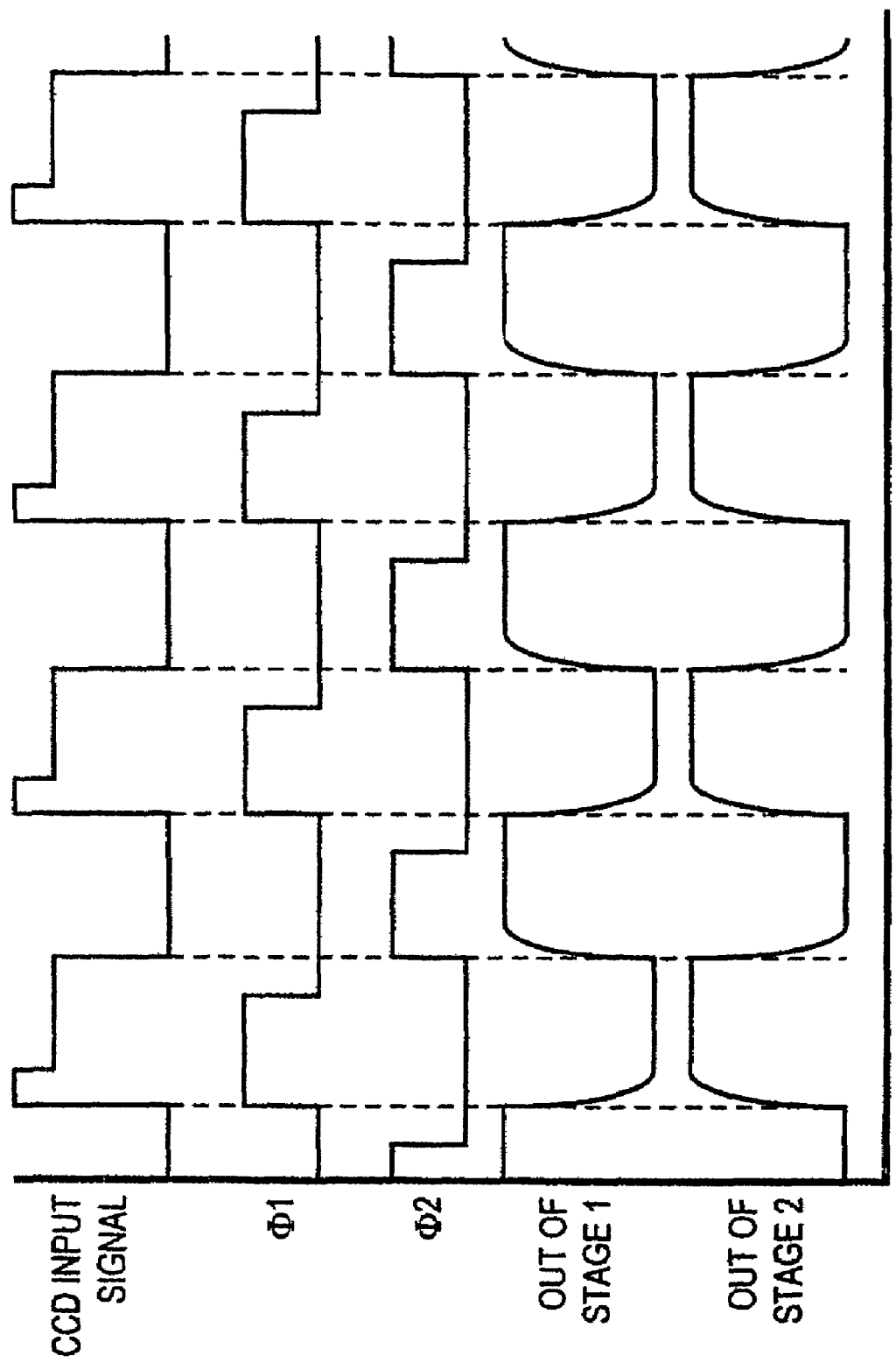
FIG. 6 is a timing diagram of the operation of a correlated double sampling variable gain amplifier (CDS/VGA) operating with a two phase clock according to an embodiment of the present invention.

Referring now to FIG. 6, there is shown a timing diagram of the two phase clock of CDSVGA circuit 114 and the imager signal, and the output signals of the first and second stages. In particular, the leading edge of the imager input signal and the leading edge of clock φ1 are temporally coincident. Clock φ2 is out of phase with clock φ1. The output of stage 2 rises as the output of stage 1 falls.

Figure 7:
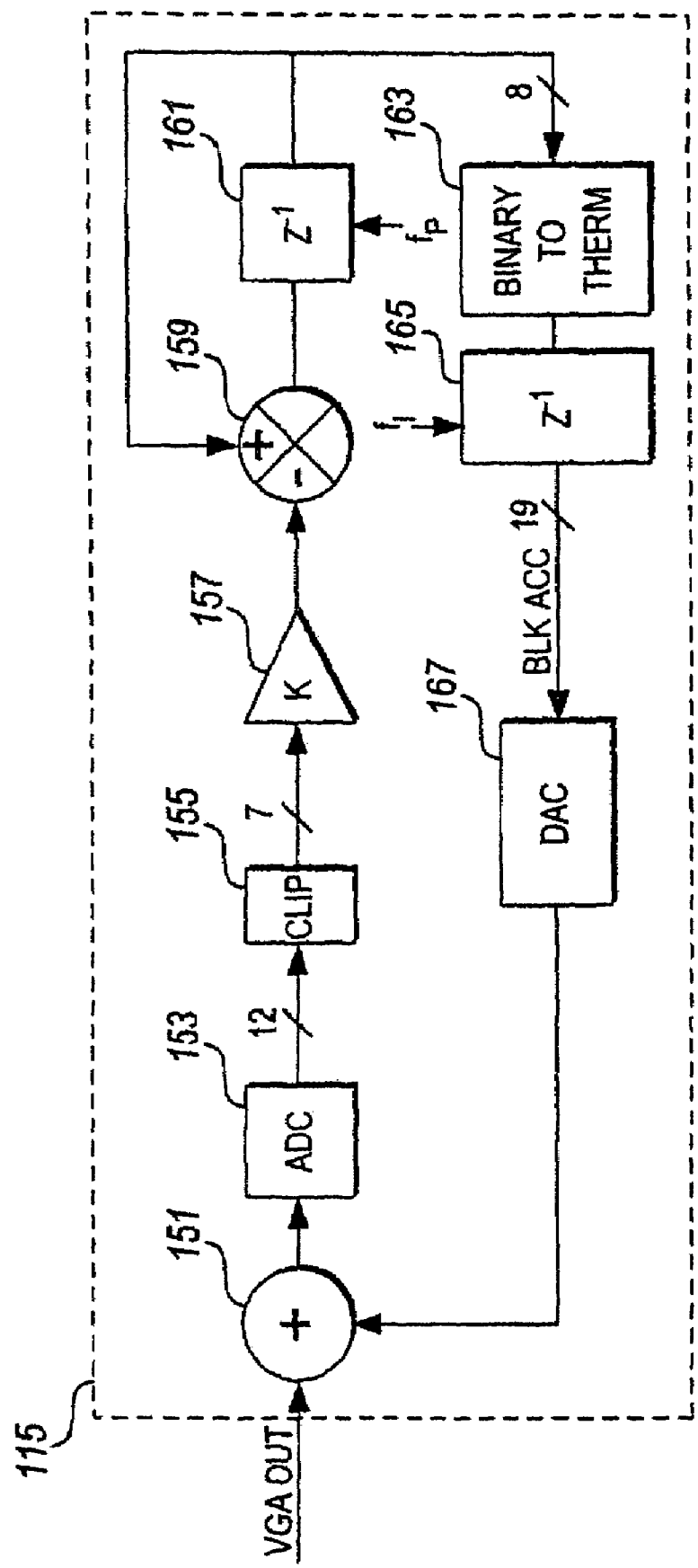
FIG. 7 is a block diagram of a black level adjustment circuit (BLAC) for an analog data processing subsystem according to the present invention.

Referring now to FIG. 7, there is shown a block diagram of a black level adjustment circuit (BLAC) 115 according to the present invention. BLAC 115 includes according to one embodiment of the present invention a first summer element 151 which receives a VGA output signal VGAOUT from CDSVGA 114 (FIG. 1B), and an analog to digital converter (ADC) 153. BLAC 115 further includes a clip circuit 155, an amplifier 157 with a gain factor K, a second summer element 159, a first unit delay element 161 having a transfer function $Z^{-1}$, a binary-to-thermometer converter 163, a second unit delay element 165 having a transfer function $Z^{-1}$, and a digital-to-analog converter 167. ADC 153 converts output signals from first summer element 151 into digital form. A 10 bit analog-to-digital converter (ADC) is employed according to the present invention, using a pipeline architecture with redundancy. After power-up, ADC 153 runs a self-calibration routine, either after power-up or automatically between every frame or on register demand, depending on a selection bit stored in an associated register. Clip circuit 155 receives a 12 bit signal from ADC 153 and clips it to a 7 bit signal according to one embodiment. Amplifier 157 amplifies the output signal from clip circuit 155 by a factor of K, which is a selected amplification factor. Second summer element 159 receives the amplified output of amplifier 157. First unit delay element 161 receives the output of second summer element 159. Binary-to-thermometer circuit 163 and second summer element 159 are connected to the output of first unit delay element 161. Second unit delay element 165 receives the output of binary-to-thermometer circuit 163 at a selected line frequency and is connected at its output to DAC 167, which in turn is connected to first summer element 151. In order to maintain a constant reference level for black pixels according to the present invention, a feedback loop is implemented to set a selected black level value at the output of ADC 153 with a 10 bit digital code 64. This loop is active when optically black pixels are output during a portion of the horizontal blanking period. The presence of black pixels in the CCD output is indicated by a CLAMP pulse. The open loop transfer function of the black level adjustment loop according to the present invention is H(z)=Kn/(z−1) where K=1/256 and "n" is the number of black pixels during a selected clamp period. The 8 most significant bits (MSBs) of the black level accumulator are read or written through the associated register. If written, the least significant bits (LSBs) are set to 0. The clamp pulse used by the black level adjustment block is delayed according to the present invention from the actual clamp pulse, because of the latency of the ADC 153. The black level adjust loop can be disabled using an associated register.

Figure 8:
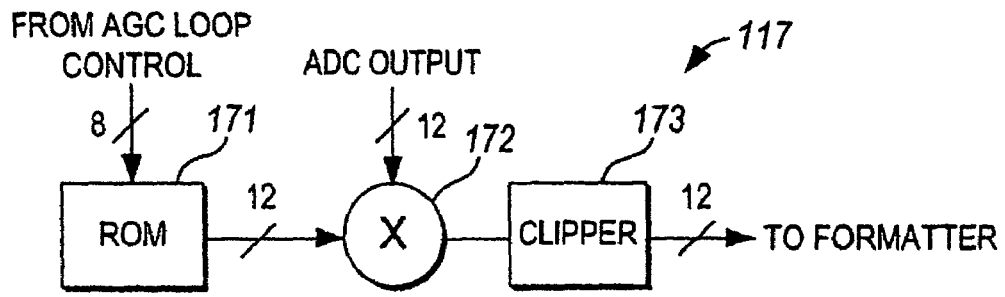
FIG. 8 is a block diagram of a digital gain circuit according to the present invention.

Referring now to FIG. 8, there is shown a block diagram of a digital gain circuit 180 according to one embodiment of the present invention. Digital gain circuit 117 according to one embodiment includes a read only memory (ROM) 171, a multiplier 172, and a clipper circuit 173. ROM 171 stores selected gain values for use as a multiplicand by multiplier 172. ROM 171 is connected to multiplier 172 which in turn is connected to clipper circuit 173. The digital gain is used in conjunction with the analog gain provided through CDS-VGA 114 (FIG. 1B) to supply a substantial controllable range of automatic gain adjustment. According to one embodiment of the present invention, the digital gain portion of the AGC is engaged only after the analog gain has been employed and an additional level of gain is desired. According to one embodiment of the present invention, the digital gain is engaged after the entire analog gain has been deployed. Digital gain provides an additional 0 to 18 dB of gain at 0.074 dB gain steps.

Figure 9:
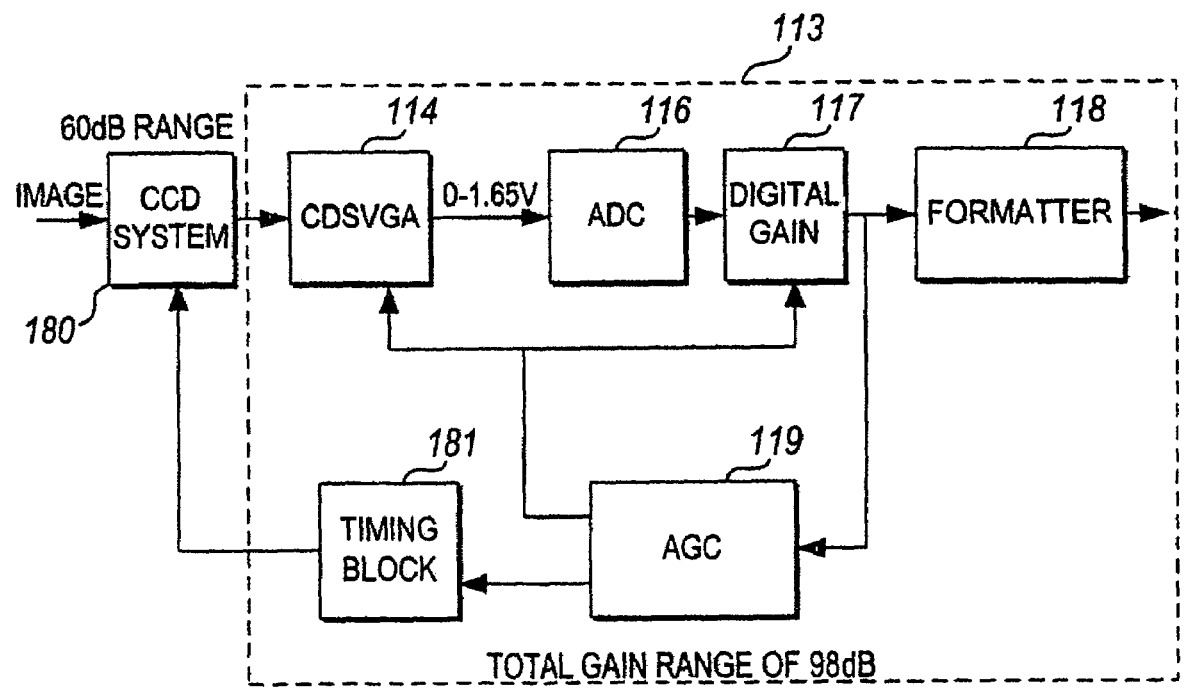
FIG. 9 is a block diagram of a gain control system for analog data processing subsystem according to one embodiment of the present invention.

Referring now to FIG. 9, there is shown a block diagram of a camera system 180 connected to an analog image processing system (AIPS) 113 which is configured according to the present invention. The imager signal is subject to external gain applied through the shutter speed setting of the camera system 180, through an analog internal chip gain provided by CDSVGA 114, and through digital gain circuit 117. A selected image is input to camera system 180, where a 60 dB gain adjustment potential can be exercised by changing the shutter speed of camera system 180. This 60 dB range is applied when there is too much light. The gain brings the video level to a good operating range. The input signal from CCD system 180 goes to a correlated double sample/variable gain amplifier (CDSVGA) circuit 114 where low frequency noise is removed and a selected analog gain level is applied. The signal is then subject to a chip gain in a range up to approximately 38 dB in the CDSVGA circuit 114 and digital gain circuit 117. This gain is used to boost dark images to a proper signal level. After a received signal is digitized by ADC 176, it is applied through an AGC control circuit 119 to set a selected level of gain according to the present invention, in analog and/or digital gain portions. The total digital gain range applicable by digital gain circuit 117 is about 18 dB according to one embodiment, which is enough to cover a substantial range of lighting conditions indoors and outdoors, as well as physical and hardware variations. Formatter circuit 118 according to the present invention takes the ADC output, clips received data to a range from binary "0000 0001 00" to binary "111 1110 11" and adds special end-of-video (EAV) and start-of-video (SAV) codes to each video line according to the present invention. The output of formatter circuit 118 is available at the pins DOUT<9:0>, causing transitions to be made at the falling edges of the pixel rate clock CLKO. Timing block circuit 181 causes CCD system 180 to shift data out during successive horizontal line periods. The data provided is shifted from the horizontal shift register of CCD system 180 at the imager output pin, one pixel at a time. Timing circuit 181 creates the required driving signals to control the timing operations of CCD system 180. The timing signals particularly enable shifting data out of CCD system 180 are H1, H2 [=not(H1)], and FR.

Figure 10:
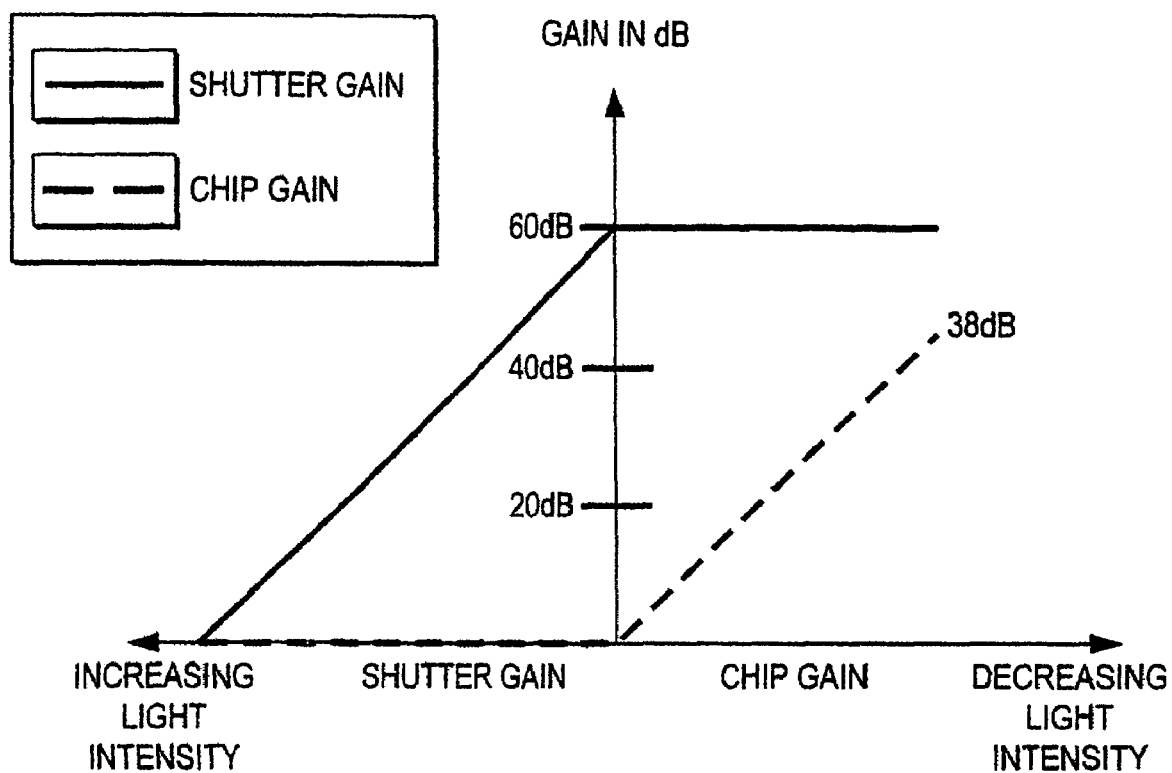
FIG. 10 is a diagram of gain control versus light intensity for shutter gain and chip gain according to the present invention.

Referring now to FIG. 10, there is shown a diagram of gain control versus light intensity for shutter gain and chip gain according to the present invention. In particular, a graph of an automatic gain control method according to the present invention shows a predetermined level of gain is applied by AGC control circuit 119 acting selectively through timing block circuit 181 upon CCD system 180, CDSVGA circuit 114, and digital gain circuit 117, to establish selected gain levels at a desired low intensity level, first with shutter gain to the extent possible, in incremental steps, for example, and then with chip gain applied through CDSVGA circuit 114 and digital gain 117. According to the present invention, gain is applied by first and second gain steps by using up the gain in the block closest to the input first (shutter gain) and then proceeding to a next gain block (the chip gain) once the complete shutter gain has already been applied. This improves the signal to noise ratio (SNR) according to the present invention. According to one embodiment of the present invention, the gain is split between both blocks seamlessly to ensure that the end of one gain region coincides with the beginning of the next gain region, and according to one embodiment each gain block has approximately equal gain steps.

Figure 11:
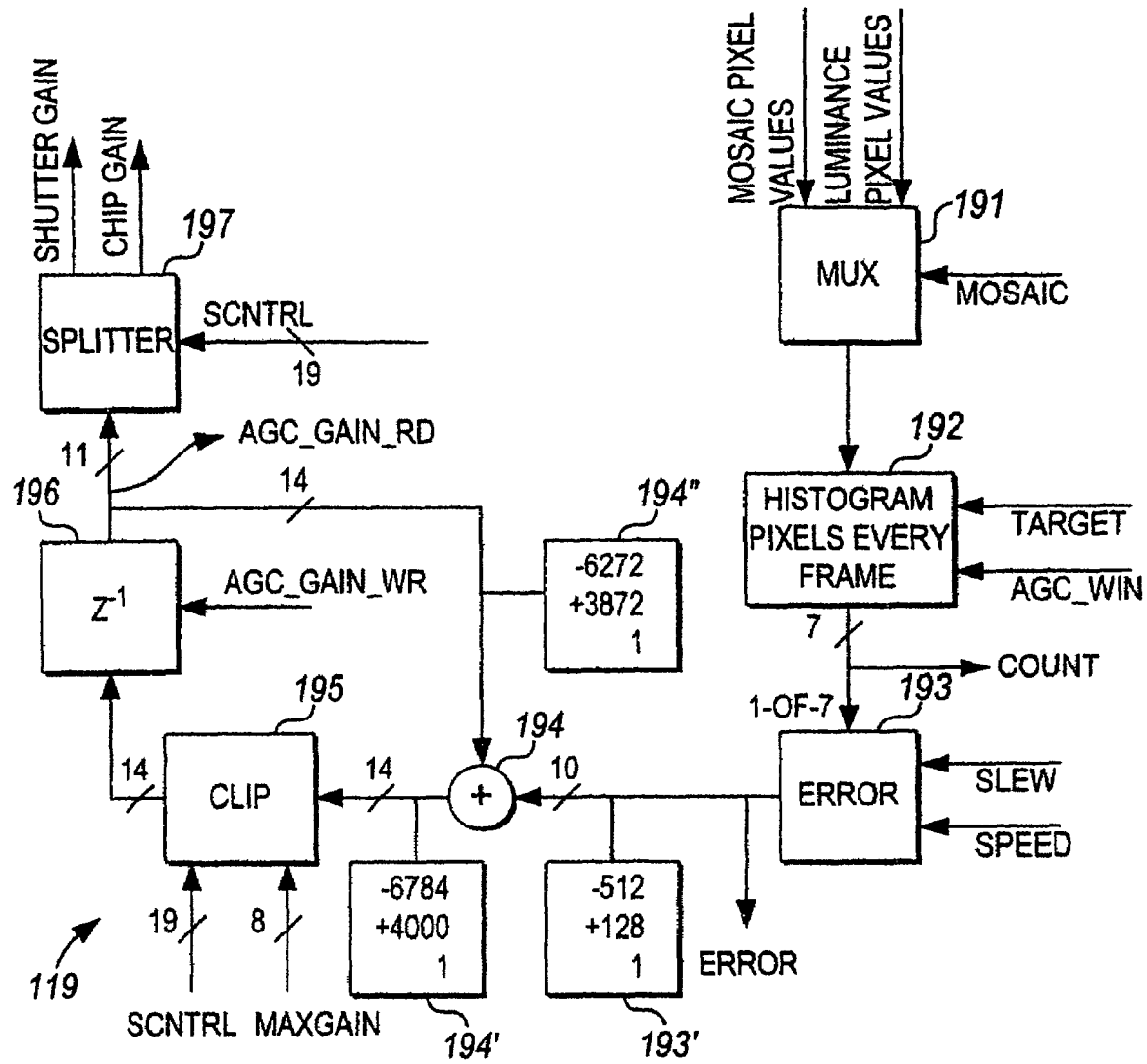
FIG. 11 is a block diagram of an automatic gain control circuit for an analog data processing subsystem according to another embodiment of the present invention.

Referring now to FIG. 11, there is shown a block diagram of an automatic gain control (AGC) circuit 119 according to one embodiment of the present invention. In particular, AGC circuit 119 includes a multiplexer (MUX) 191 configured to receive input mosaic pixel values and luminance pixel values subject to control line settings of a signal line MOSAIC, permitting selection of whether mosaic pixel values or luminance pixel values are to be provided to histogram circuit 192. AGC circuit 119 further includes a histogram circuit 192 subject to control signals TARGET and AGC_WIN, an error circuit 193 connected to histogram circuit 192, a summation element 194 connected to error circuit 193, a clip circuit 195 connected to summation element 194, a unit delay element 196 connected to the clip circuit 195, and a splitter circuit 197 connected to the unit delay element 196 effective for producing a shutter gain signal and a chip gain signal to control relative gain settings according to the present invention. The output of unit delay element 196 provides a selected gain slope subject to a gain input provided from clip circuit 195 subject to explicitly written override values AGC_GAIN_WR. AGC circuit 119 receives pixel values of either mosaic or luminance style and generates a histogram of the received data for successive full frames according to the present invention. Based on the contents of the histogram, image brightness levels to be selected are determined, causing an AGC value to be incremented, decremented, or left unchanged for each frame. Histogram circuit 192 stores frame data into histogram bins as discussed further below. Error circuit 193 takes the histogram information and generates an error code that either increments or decrements or does not change the output AGC gain value. Summing element 194 accumulates the AGC value in view of an error signal from error circuit 193, and clip circuit 195 clips the result to insure that it is within a predetermined gain range. Splitter circuit 197 takes received gain values and distributes them to an appropriate gain block including shutter and chip gain circuits.

Figure 12:
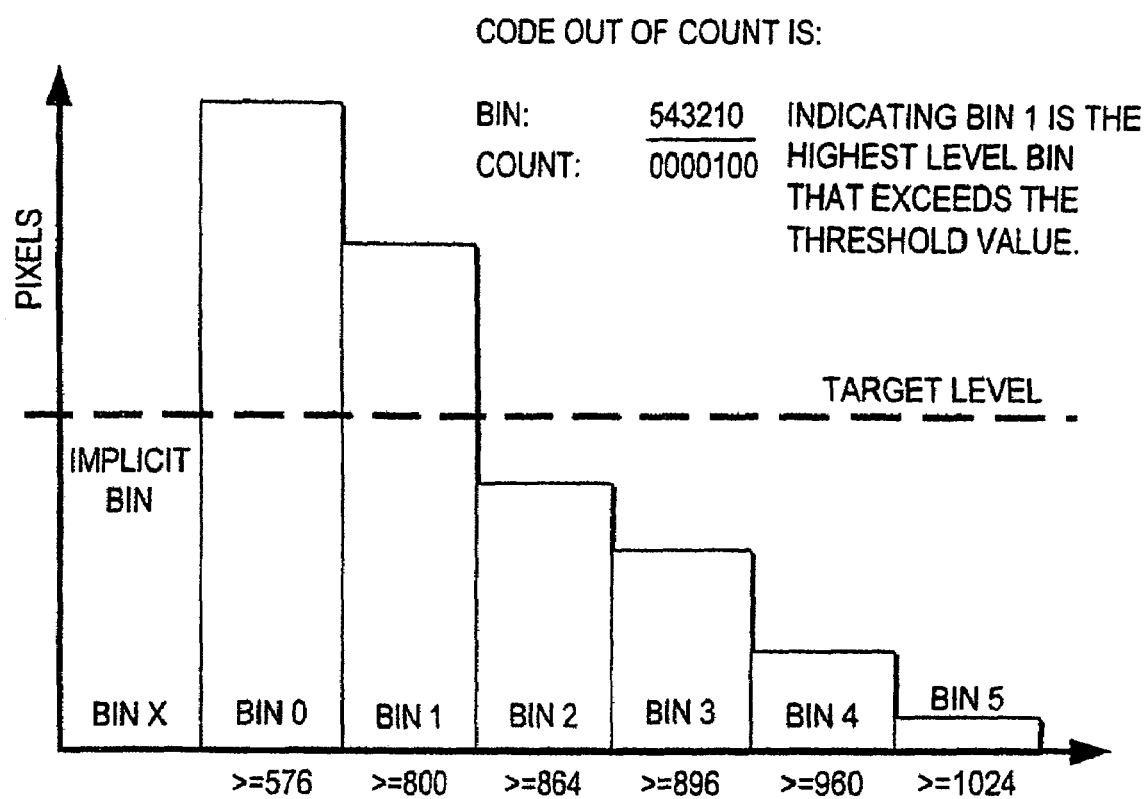
FIG. 12 is a histogram used in an automatic gain control circuit according to the present invention of one frame of pixel data produced by an imager system.

Referring now to FIG. 12, there is shown a diagram of a histogram according to one embodiment of the present invention. Data from each frame captured by the camera system is categorized into particular bins of the histogram according to brightness level. Six explicit bins and one implicit bin are included. The applicable fixed value needed to increment each bin is shown below the chart. The target level a bin needs to exceed for a particular output of the histogram block is programmable through a target level register. The output of histogram circuit 192 is a 7 bit word, where only one bit is high, indicating the highest level bin that exceeds a target level. According to one example, a count of 0000100 indicates bin 1 is the highest level bin above the threshold.

Table 5 below is a diagram showing error signal generation by error circuit 193 according to the present invention. A 7 bit code is produced from histogram circuit 192, corresponding to one of the seven bins provided according to one embodiment of the present invention. From this, an appropriate error code is chosen and multiplied by a speed factor. The value of slew and speed are programmable. The slew value establishes the recovery speed from a very bright picture that saturated the output of the ADC.

TABLE 5

ERROR CODE GENERATION

| Bin | Error | Error Output |
| --- | --- | --- |
| Bin5 | SLEW | Error × (Speed Multiplier) |
| Bin4 | −2 | |
| Bin3 | −1 | |
| Bin2 | 0 | |
| Bin1 | 1 | |
| Bin0 | 4 | |
| BinX | 16 | |

One of three AGC windows can be selected through associated register according to one embodiment of the present invention. In particular, a full AGC window, a ¼ full AGC window, and a 1/16 full AGC window can be selected. Changing the area upon which AGC adjustments are applied permits better scene selection according to the present invention. Maximum gain, minimum chip gain, and maximum shutter gain are programmable according to the present invention. The user selects maximum gain to cause a scene to go dark at a certain low light level rather than gaining up to a noisy image. A minimum chip gain level prevents the output of the camera system from becoming saturated by the time the shutter gain is supposed to be active. If the output of the imager saturates, the shutter gain will never be engaged and particular bright scenes will be lost.

Figure 13:
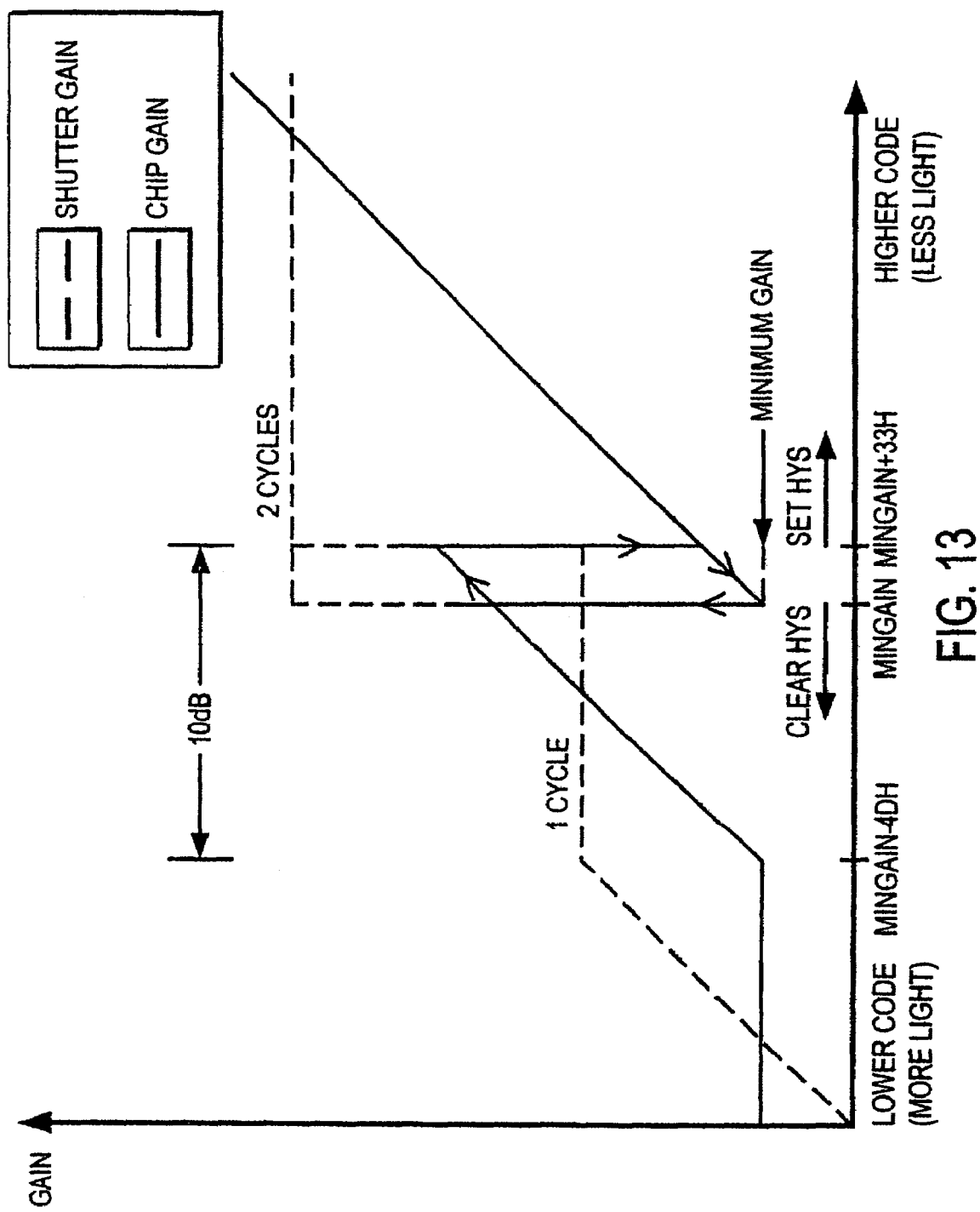
FIG. 13 is a diagram of gain with a flickerless setting having hysteresis in accordance with operation according to the present invention.

Referring now to FIG. 13, there is shown a diagram of gain as a function of code or light intensity with a flickerless setting established by hysteresis. Flickerless modes are included according to the present invention to enable indoor operation with fluorescent lights. If the fluorescent light flickers at twice the frequency of the power supply frequency, it is averaged upon receipt by the camera system over an integer number of cycles to avoid flicker in the resulting video to be displayed. There are two possible flickerless settings for particular exposure times. One setting averages one cycle of the fluorescent lights and another averages two cycles of the fluorescent light. A hysteresis loop is used according to the present invention to prevent variations in gain from causing the shutter speed to jump back and forth between the one and two cycle settings. Such flickering would produce undesirable effects, since analog gain is difficult to set to match a 2× gain step exactly. Flickerless modes are possible for combinations of camera type (PAL or NTSC) and operation environments (PAL or NTSC).

Figure 14:
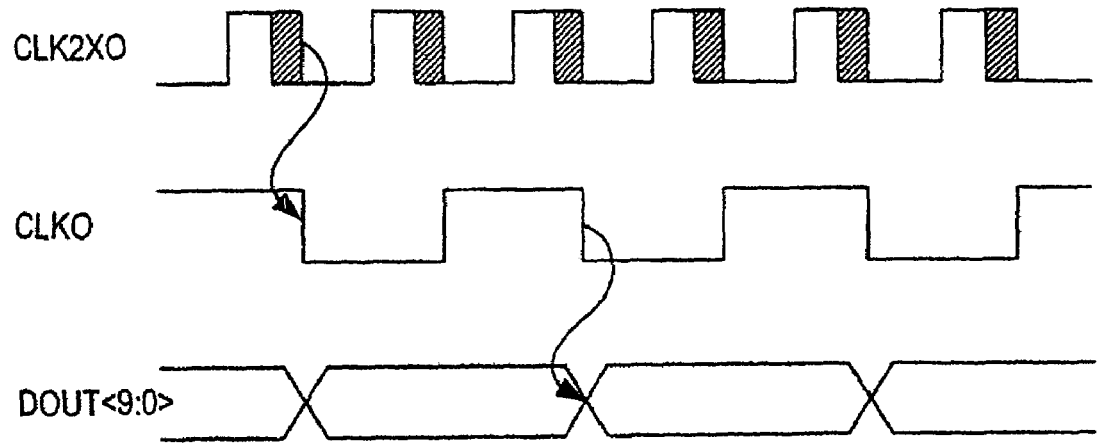
FIG. 14 is a timing diagram of output data as a function of clock signals for the analog subsystem according to the present invention.

Referring now to FIG. 14, there is shown a timing diagram for a non-interpolated system according to the present invention, in which the falling edges of clock CLKO lag the falling edges of CLK2XO by 4 to 8 nanoseconds and both clocks have approximately 50% duty cycles. Data <9:0> is output at the falling edges of CLKO.

An output digital data format according to the present invention for the AIPS 103 particularly includes embedded end of active video (EAV) code, blank codes, and start active video (SAV) code. The timing reference signals are contiguous with the video data and continue through the vertical blanking interval. Each timing reference signal consists of the four-word sequence. In addition to the embedded EAV and SAV timing signals, the CS7665 provides individual synchronization output signals which are employed by many video encoder circuits. These synchronization signals are typically used to interface the H.656 digital video stream to other components and subsystems. The individual synchronization signals include HREFOUT and VREFOUT. HREFOUT is an active-high signal indicating when active pixel data is being transmitted on $DO_{A[0-9]}$ or $DO_{B[0-9]}$. HREFOUT is low when non-active picture data is being transmitted during horizontal blanking. Depending on the mode of operation, the HREFOUT signal follows either the HREFIN signal or the HREF defined by the EAV and SAV code. VREFOUT is an output signal that is active high when the CS7665 is putting out active video lines. The active-low portion of this signal defines the vertical blanking period. Alternately, when the ZV mode bit in register 06h is set, this output behaves as a VSYNC signal appropriate for ZV ports. The VSYNC signal is active-high during the first six horizontal line period of every field. The transition in VSYNC signal lags the HREF signal's rising edge during odd field and leads the rising edge of HREF during even field. The CS7665 delivers 4:2:2 component digital video output data in YCrCb format. The digital outputs can be configured for 10-bit interleaved Y and CrCb data, or for 20-bit parallel operation. The IN-TERL bit of the Operational Control Register 06h determines which output format is active. Logic 0 places the CS7665 in interleave mode with output data on channel "A". Logic 1 places the CS7665 in non-interleaved mode where luminance data is output on channel "A" and chrominance data is output on channel "B". According to one embodiment of the present invention, second SPS 18 accepts 10 bit digital video data samples from first SPS 17 in a CCIR 656 format. Such data samples include cyan, magenta, green and yellow pixel values, with a black reference level set at code 64. Binary codes "0000 0000.xx" and "1111 1111.xx" are reserved for synchronization information. Horizontal and vertical synchronization information is encoded in the data stream, according to one embodiment of the present invention. A diagram of an input video data waveform signal to first SPS 17 from CCD array sensor 14 begins at a horizontal reference level (HREF), enters a blanking period, and then completes with presentation of active video content. The blanking period includes transmission of EAV code, blank code, and SAV code. "T" is the output sample period. The blanking period includes three subperiods, the first being 4T sampling periods long, the second being $N_bT$ sampling periods long, and the third being 4T sampling periods long. EAV code is transmitted in the first subperiod of the blanking period, comprising four sample periods, respectively 0-3, according to the following Table 6. For this table, "f" is the field bit, "0" is the first field, "1" is the second field, "v" is the vertical blanking bit, "0" represents active video lines, "1" represents vertical blanking, and $P_3P_2P_1P_0$ are respective error protection bits as per CCIR standard 656.

TABLE 6

EAV code

| Smpl. | Word |
|---|---|
| 0 | Hex FF |
| 1 | Hex 00 |
| 2 | Hex 00 |
| 3 | Bin 1fv1 $P_3P_2P_1P_0$ |

Blank code is transmitted in the second subperiod of the blanking period, comprising multiple sample periods including sample periods 4-7 et seq., according to the following Table 7:

TABLE 7

Blank code

| Smpl. | Word |
|---|---|
| 4 | Hex 80 (U) |
| 5 | Hex 10 (Y) |
| 6 | Hex 00 (V) |
| 7 | Hex 10 (Y) |
| | repeat above 4 words |

SAV code is transmitted in the third subperiod of the blanking period, comprising four sample periods including sample periods 0-3, according to the following Table 8:

TABLE 8

SAV code

| Smpl. | Word |
|---|---|
| 0 | Hex FF |
| 1 | Hex 00 |
| 2 | Hex 00 |
| 3 | Bin 1fv0 $P_3P_2P_1P_0$ |

During the active video period, active video samples of mosaic data are transmitted, except during VREF, when U=V=80(hex) and Y=10 (hex).

Figure 15:
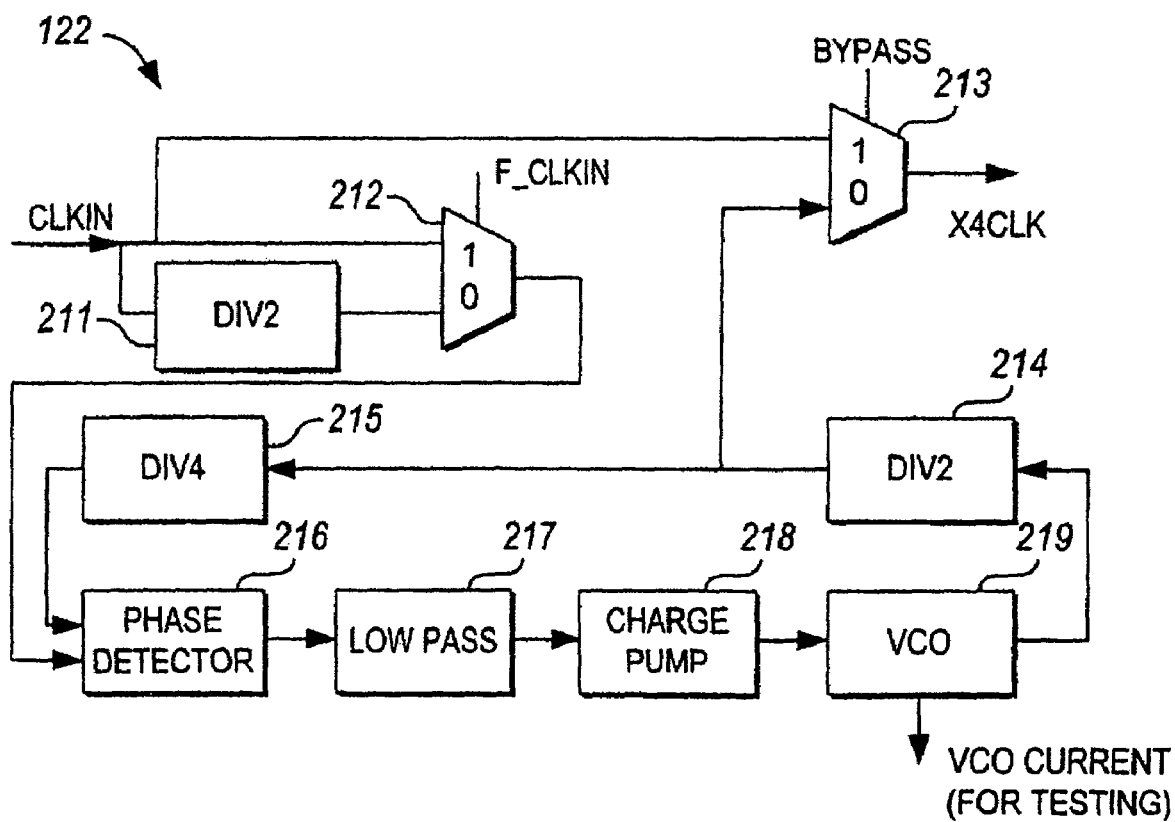
FIG. 15 is a block diagram of a frequency synthesizer phase locked loop (FSPLL) circuit according to the present invention.

Referring now to FIG. 15, there is shown a block diagram of a frequency synthesizer phase locked loop (FSPLL) 122 according to the present invention. In particular, FSPLL 122 includes a first divide by 2 (DIV2) circuit 211, a first multiplexer 212, a second multiplexer 213, and second divide by 2 (DIV2) circuit 214, a divide by 4 (DIV4) circuit 215, a phase detector circuit 216, a low pass filter 217, a charge pump circuit 218, and a voltage controlled oscillator (VCO) circuit 219. FSPLL 122 receives an input clock signal CLKIN which is provided to first and second multiplexers 212 and 213 as well as to first divide-by-2 circuit 211. The output of first divide-by-2 circuit 211 is provided to multiplexer 212, which is subject to an output select signal F_CLKIN. Second multiplexer 213 is subject to a select signal BYPASS. The output of first multiplexer 212 is provided to phase detector 216 which in turn is connected to low pass circuit 217. Low pass filter circuit 217 is connected in turn to charge pump 218 which in turn is connected to VCO circuit 219, which then is connected to second divide by 2 circuit 214. The output of divide-by-2 circuit 214 is provided to divide-by-4 circuit 215 and to multiplexer 213. Divide-by-4 circuit 215 is connected to phase detector 216. Multiplexer 213 provides a ×4 multiplied output signal from frequency synthesizer 122 when select signal, BYPASS, is 0. Thus, FSPLL 122 provides 4× the input pixel clock frequency according to one embodiment of the present invention. Table 9 below provides parameters according to one embodiment of the present invention for FSPLL 122:

TABLE 9

FREQUENCY SYNTHESIZER PARAMETERS

| Symbol | Parameter | Min | Typ | Max | Units |
|---|---|---|---|---|---|
| $F^{XTALIN}$ | CLKIN Frequency | 6.75 (F_CLKIN = 1) | | 27 (F_CLKIN = 0) | MHZ |
| $D^{XTALIN}$ | CLKIN Duty Cycle | 20 | | 80 | % |
| $F^{X4CLK}$ | X4CLK Frequency | 27 | | 54 | MHZ |
| | Output Jitter | | 200 | | ps |
| | Duty Cycle | | 50 | | % |
| | PLL Acquisition Time | | 20 | | us |

Figure 16:
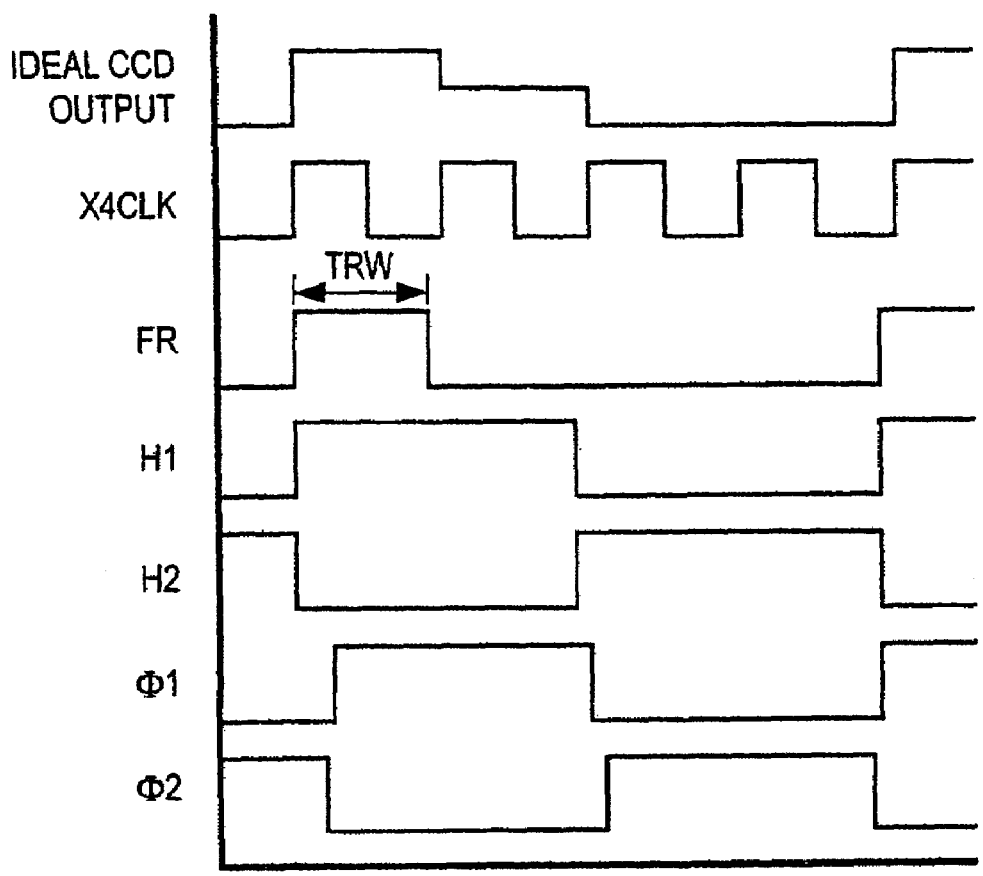
FIG. 16 is a timing diagram of imager signals for selected pixel operations.
Figure 17:
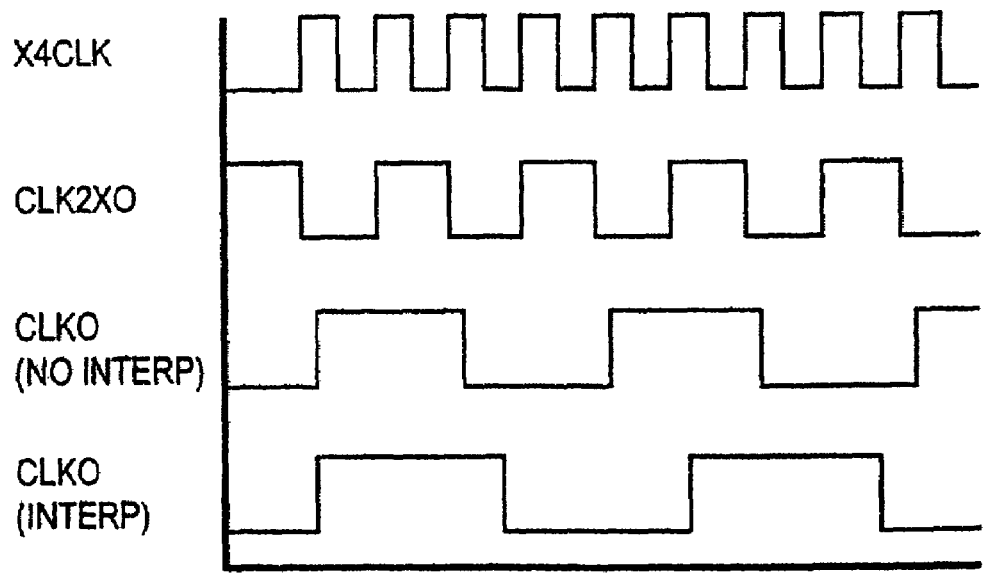
FIG. 17 is a timing diagram of pixel clocks in an analog timing circuit for an analog data processing subsystem according to the present invention.

Referring now to FIG. 16, there is shown a timing diagram of imager signals during pixel sampling operation. The timing signals are generated from clock X4CLK, as shown in FIG. 17. For every pixel clock cycle, one pixel is read-out from CCD system 180 of FIG. 7. Pixel timings are based on clock X4CLK running at a factor of 4 or 5 (when horizontal interpolation is used for the 624 active pixel case) times the pixel clock. Circuit timings are referenced from a reset gate pulse FR. The pixel timings change with the total number of output pixels per horizontal line. The horizontal line period is fixed at 63.5 microseconds for NTSC systems. The rising edge of H1 in FIG. 16 is adjusted relative to the rising edge of clock φ1. The rising edge of FR is adjusted relative to the falling edge of clock φ2, and the falling edge of FR is adjusted relative to a point ¼ pixel cycle after the falling edge of clock φ2 for the non-interpolation mode and ⅕ pixel cycle after the falling edge of clock φ2 for the interpolation mode. Each edge is controlled by two bits in an associated register, and the relative phase delays are listed in Table 10 below, where Δt is about 1 to 2 nanoseconds:

TABLE 10

H1 AND FR PHASE ADJUSTMENTS

| H1 | | FR | | |
|---|---|---|---|---|
| rising edge bits<7:6> | falling edge bits<5:4> | rising edge bits<3:2> | falling edge bits<1:0> | Phase Delay (ns) |
| 00 | 00 | 00 | 00 | 0 |
| 01 | 01 | 01 | 01 | Δt |
| 10 | 10 | 10 | 20 | 2 * Δt |
| 11 | 11 | 11 | 11 | 3 * Δt |

Referring now to FIG. 17, there is shown a timing diagram of pixel clocks from timing block circuit 181 (FIG. 8) according to the present invention. Timing block circuit 181 provides driving signals to control CCD system 180 (FIG. 8) and controls the embedding of active video start and end information in the data stream produced by CCD system 180. The timing signals produced are particularly shown in FIG. 17 and are discussed in the associated text. The timing signals are tailored according to the present invention to selected operating phases of CCD system 180. Charge read-out timing signals apply when once every field, the accumulated charge generated by the photo gates of CCD system 180 is transferred to the vertical shift register. This transfer takes place during a specific horizontal line. The timing signals involved in this operation are V1X, V2X, V3X, V4X, VH1X, and VH3X. Vertical transfer timing signals apply when on every horizontal line period, one line of data from the vertical shift register is shifted down into the horizontal shift register. The timing signals involved in this transfer are V1X, V2X, V3X, and V4X.

Figure 18:
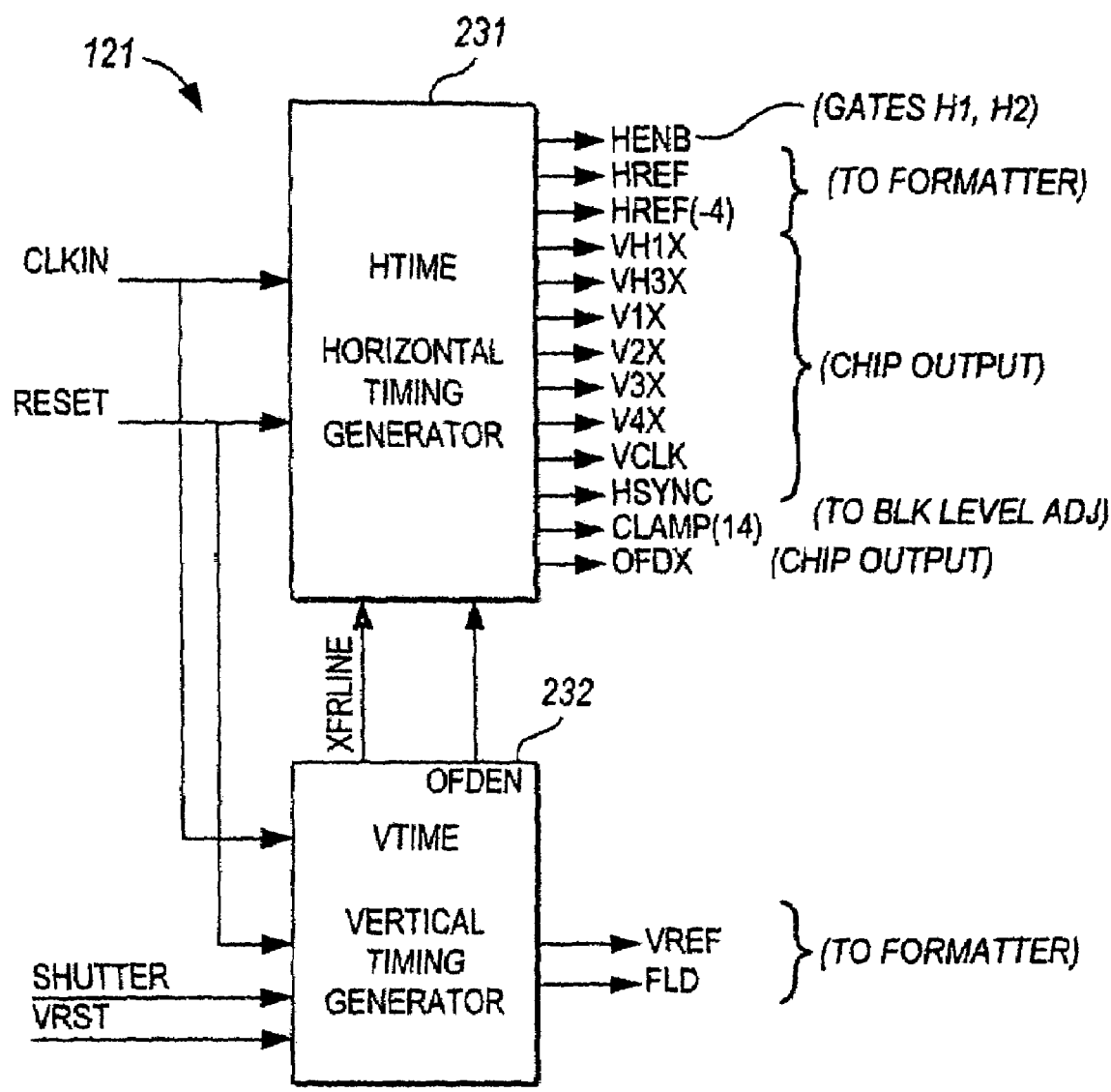
FIG. 18 is a block diagram of a timing circuit for an analog data processing subsystem according to the present invention.

Timing generator circuit 121 includes a horizontal timing generator 231 and a vertical timing generator 232, as shown in FIG. 18. The horizontal timing generator 231, time_hor, generates timing signals required to control events on a per horizontal line basis. These timing parameters include the following signals:

1. HREF—horizontal reference signal. It stays active high during the active video portion of each line.
2. HREF(-4)—HREF advanced by 4 pixel clock periods.
3. HENB—horizontal shift register clock enable signal. Enables H1 and H2 out of analog timing.
4. V1X, V2X, V3X, and V4X—vertical register shift clock. Used both during vertical transfer and charge read-out.
5. VH1X, VH3X—CCD charge read-out pulse.
6. VCLK—signal used by the DC/DC converter. At the normal mode, it is the same as HREF; at the faster mode, it operates at about 1/16 of the horizontal line frequency and gets reset at the beginning of HREF.
7. HSYNC—horizontal sync signal.
8. CLAMP(14)—black clamp signal provided to the ADC. CLAMP(14) is this clamp signal delayed by the pipeline delay of the ADC.
9. OFDX—overflow drain control clock. This signal sets the electronic shutter speed.

Figure 19:
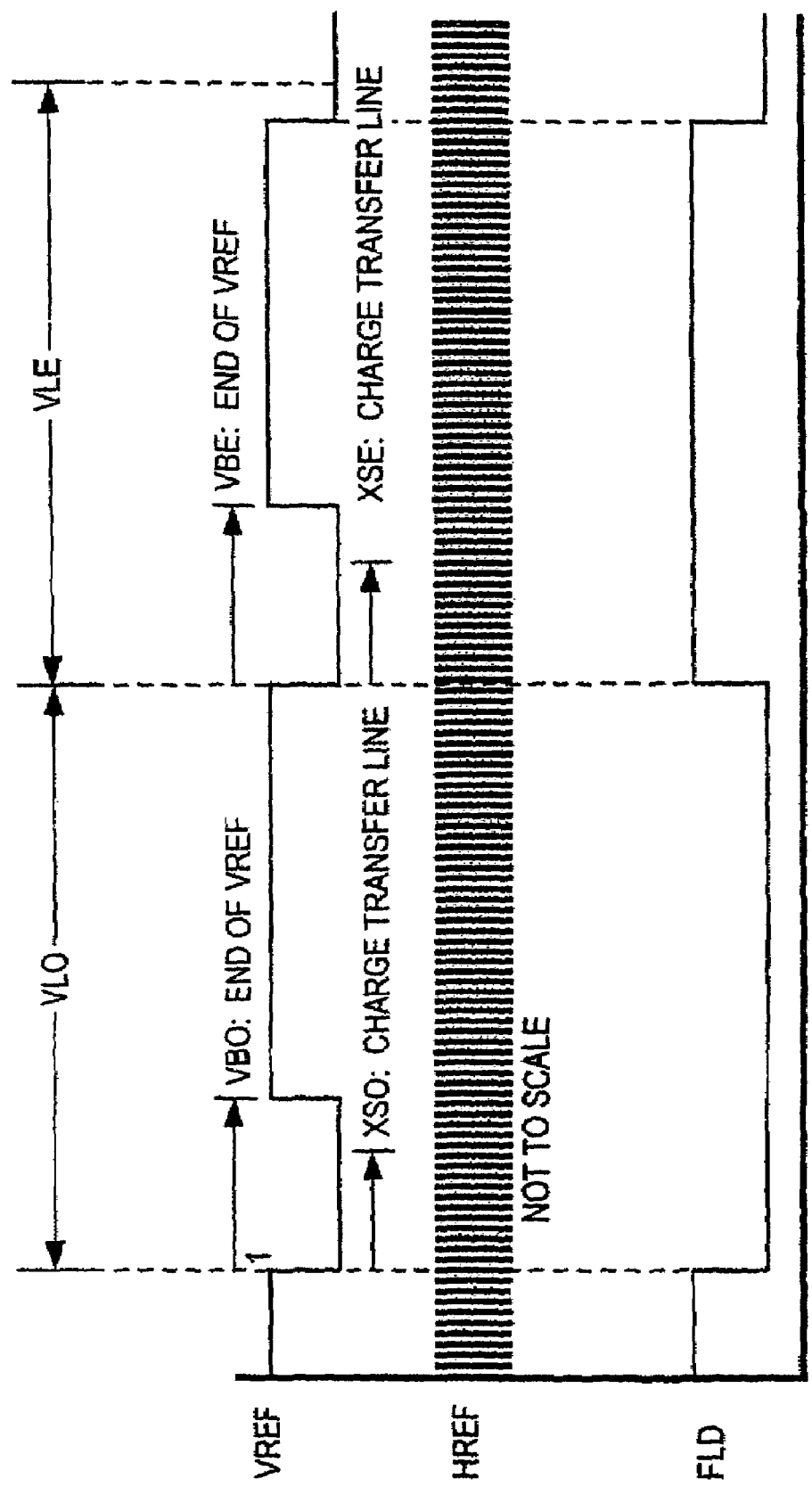
FIG. 19 is a diagram of vertical timing signal operation according to one embodiment of the present invention.

Referring now to FIG. 19, there is shown a diagram of vertical timing signal operation according to one embodiment of the present invention. The vertical timing generator generates timing signals to control events on a per field basis. These timing signals include the following:

1. OFDEN—enable signal to control the number of lines the OFDO clock is active.
2. XFRLIN[3]—indicates lines on which CCD charge read-out is performed.
3. VRST—Vertical field reset signal.
4. FLD—FLD=1 indicates the odd field of CCD data.
5. VREF—vertical reference signal. It is active high during the active video lines.

The CCD system includes an array which is read out alternately as odd and even fields with interlaced horizontal lines. Thus, each field has half the total number of horizontal rows.

Figure 20:
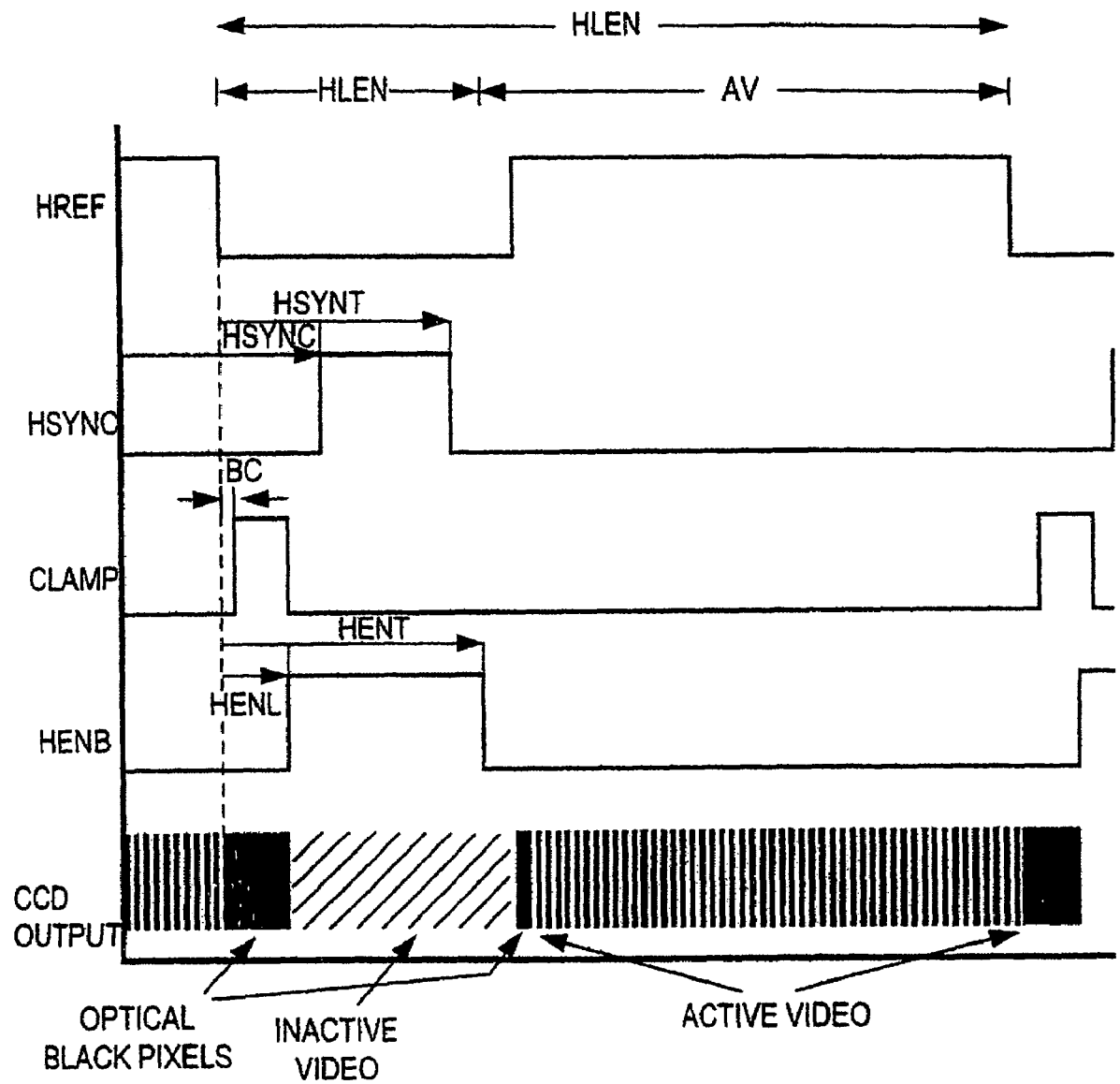
FIG. 20 is a timing diagram of horizontal and clamp signals in CCD operation according to the present invention.

Referring now to FIG. 20, there is shown a timing diagram of horizontal and clamp signals, according to the present invention. In particular, FIG. 20 shows timing information for HREF, HSYNC, CLAMP, and HENB signals according to the present invention. The waveforms for these signals are repeated on every line. The horizontal shift register clocks H1 and H2 operate at the CLKO frequency and are active throughout the horizontal line period except when HENB is high.

Figure 21:
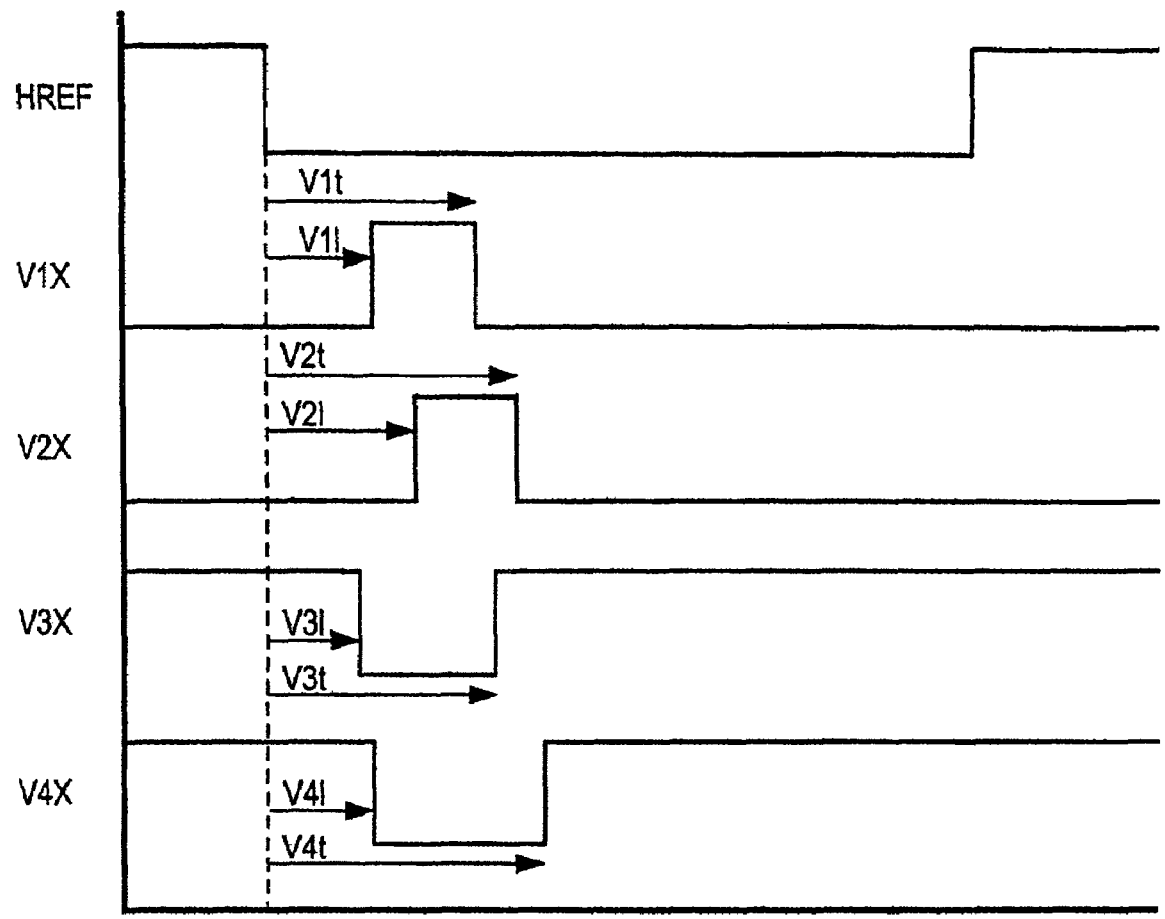
FIG. 21 is a timing diagram of vertical shift register signals in operation according to the present invention.

Referring now to FIG. 21, there is shown a timing diagram of vertical shift register signals in operation according to the present invention.

Figure 22:
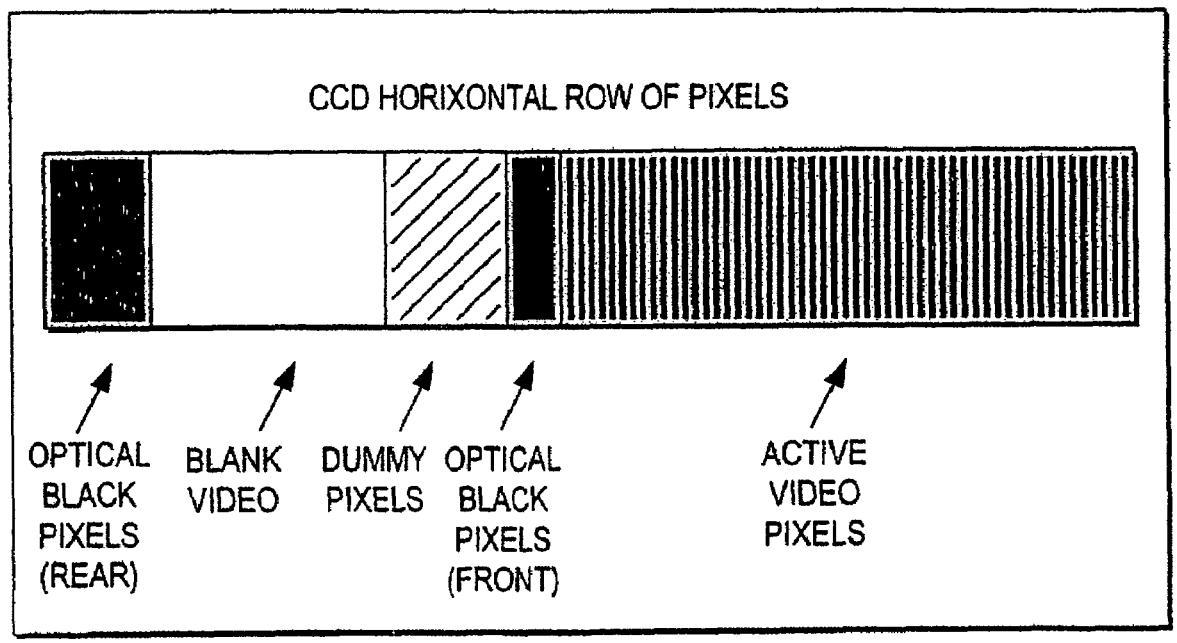
FIG. 22 is a diagram of an imager horizontal pixel row according to the present invention.

Referring now to FIG. 22, there is shown a diagram of an imager horizontal pixel row according to one embodiment of the present invention. Each horizontal row of a CCD system is divided into regions corresponding to a particular type of pixel. Different camera systems have different numbers of pixels in each region, and the timing signals established according to the present invention are adaptive to this requirement. Horizontal timing for CCD system 180 according to the present invention is particularly based on maintaining a fixed 63.5 microsecond horizontal line time.

Figure 23:
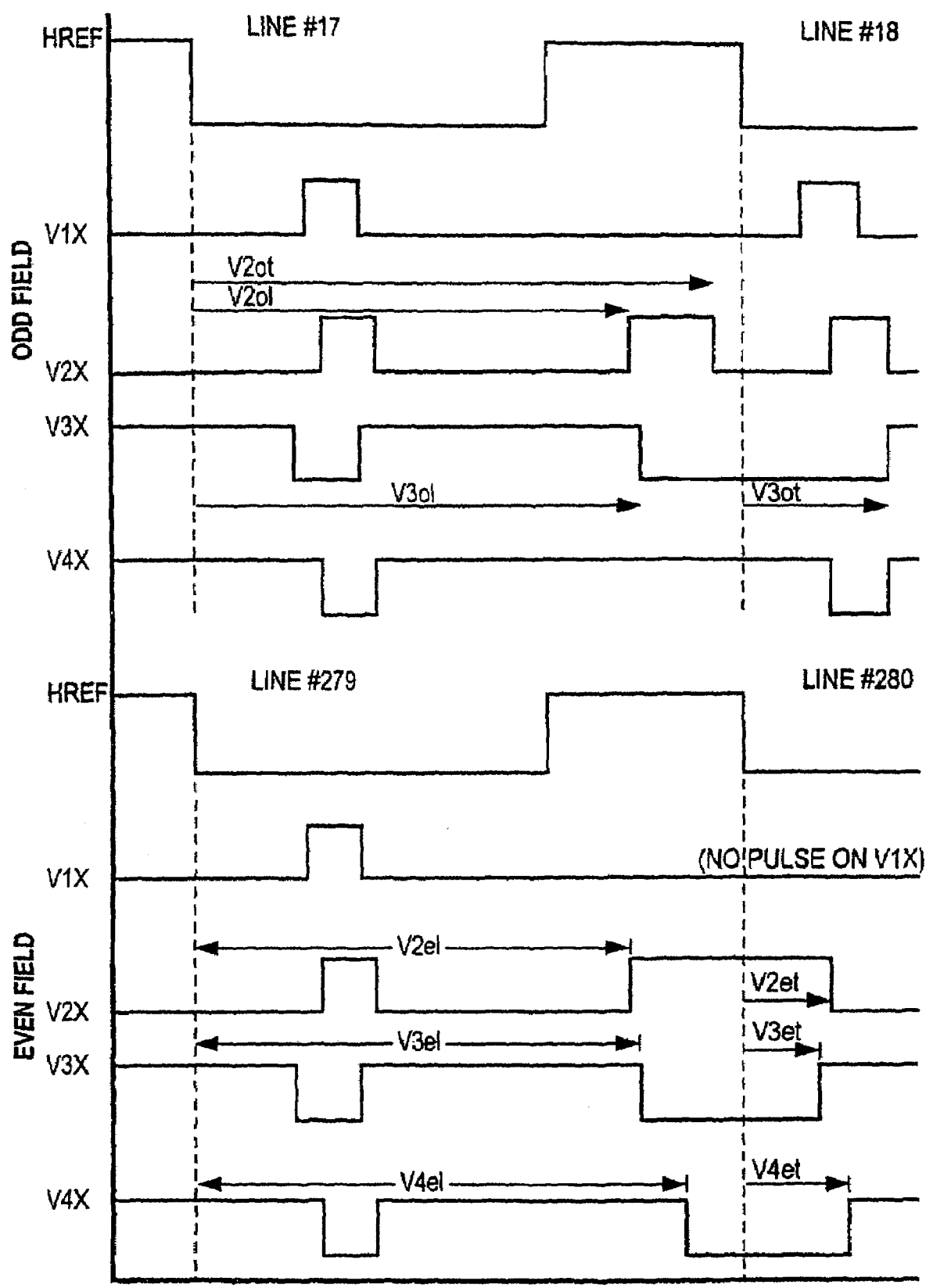
FIG. 23 is a timing diagram of vertical shift register signals for charge readout phase in operation according to the present invention.

Referring now to FIG. 23, there is shown a timing diagram of selected vertical shift register signals according to the present invention. FIG. 23 particularly shows the timings for the V1X through V4X signals. The specified waveforms repeat on every horizontal line except during charge transfer lines. Signals VH1X and VH3X are required during charge read-out, as shown in FIG. 24.

Figure 24:
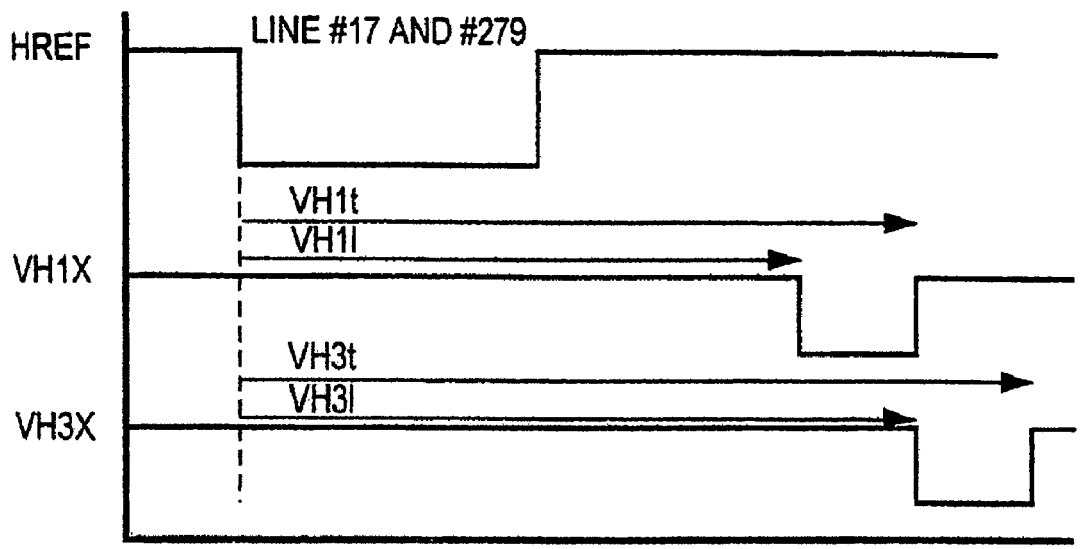
FIG. 24 is a timing diagram of selected charge read-out signals in operation according to the present invention.

Referring now to FIG. 24, there is shown a timing diagram of charge read-out signals according to the present invention. OFD signal is used to control the electronic shutter timing of the camera system. Overflow drain control signals are shown in FIG. 25.

Figure 25:
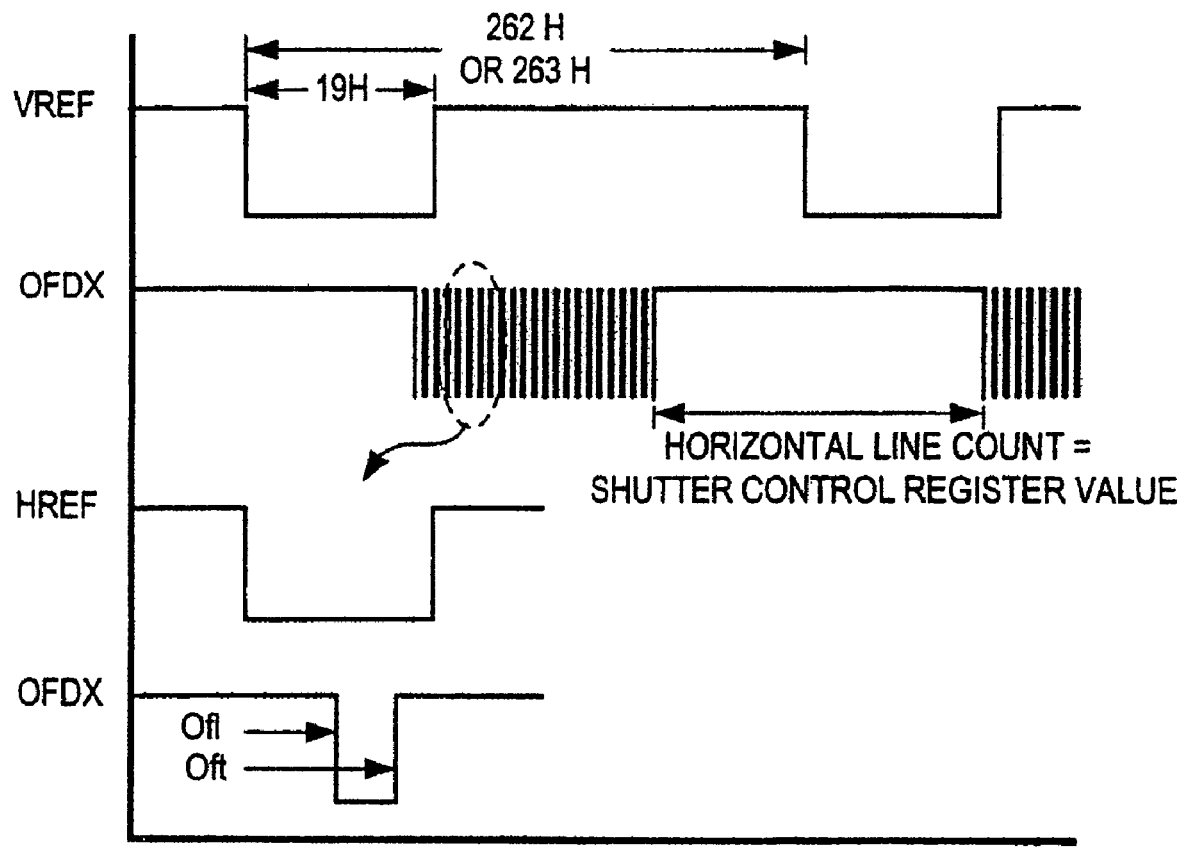
FIG. 25 is a timing diagram of selected electronic shutter control signals according to the present invention.

Referring now to FIG. 25, there is shown a timing diagram of electronic shutter control signals according to the present invention.

Figure 26:
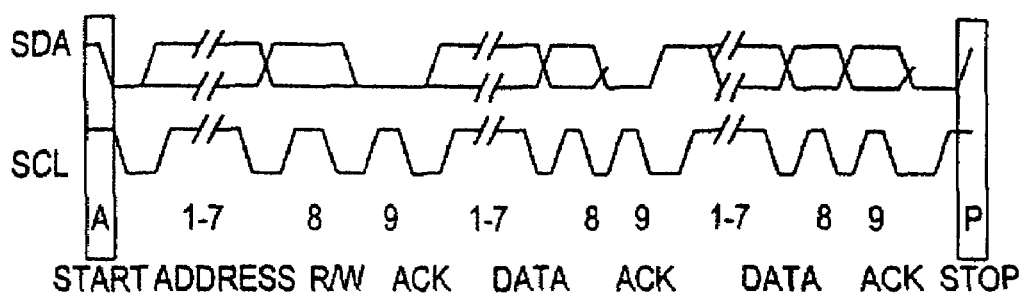
FIG. 26 is an I2C operation figure according to the present invention.

Referring now to FIG. 26, there is shown a timing diagram for I2C interfacing according to the present invention. The AIPS I2C interface can be accessed two ways. One, an external controller can read and write to all the registers of AIPS 103. Two, the AIPS 103 can be accessed through the DSPS which controls the AIPS register reads and writes. Control of the I2C interface is through two external pins, a bidirectional data pin (SDA) and a serial input clock (SCL) according to I2C protocol specifications. SDA is a bidirectional line, connected via an external pull-up resistor to a positive supply voltage as shown in detail in the related application which is incorporated herein by reference. When the bus is free, both lines are HIGH. The output stages of devices connected to the bus have an open drain in order to perform a wired-AND function according to the present invention. Data on the I2C bus can be transferred at a rate of up to 400 kbit/sec, according to one embodiment. The write format includes a three byte packet. The first byte is the station address with the direction bit set to "0" in order to indicate a "write." The second byte is the device register address (0 . . . 255). The third byte is the register data. A sequential write can be done if instead of the stop bit at the end, an acknowledge bit is sent and the sequential address is written with the next data byte. The address set format includes a two byte packet. The first byte is the device address with the data direction bit set to "0" in order to indicate a "write." The second byte is the register address. The address set format is the same as a write format; however, the register data is not sent. It is used to set the address for the read format. The read format includes two bytes. The first byte is the station address with the direction bit set to "1" in order to indicate a "read." The AIPS 103 then sends a byte back on the bus, from the register which was addressed by the last write format or address set format. A sequential read is done by using an acknowledge bit permitting data from the sequential address to be read. Writing a 1 to the reset registers triggers a software reset in AIPS 103. Software reset resets selected digital blocks except for I2C and ADC calibration logic elements.

Figure 27:
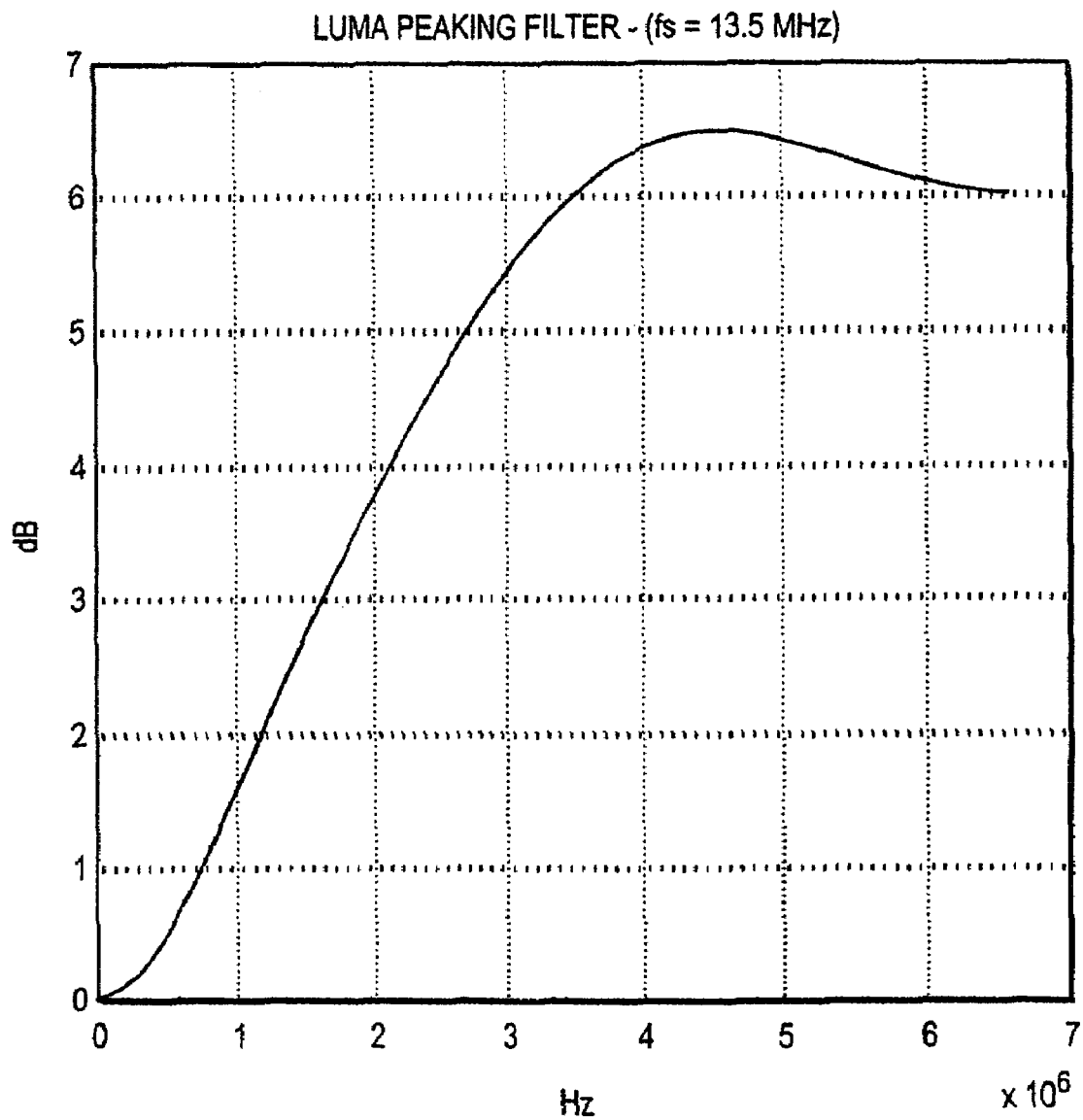
FIG. 27 is a diagram of the transfer curve of a luma high pass filter, according to the present invention.

Referring now to FIG. 27, there is shown a diagram of the transfer curve of a luma high pass filter, according to the present invention. High frequency components are emphasized in transfer curve to sharpen the selected images. A luma filter equation, according to one embodiment of the present invention, is given by the relationships $H(z)=[-Z^{-1}-2Z^{-2}+14Z^{-3}-2Z^{-4}-Z^{-5}]$.

Figure 28:
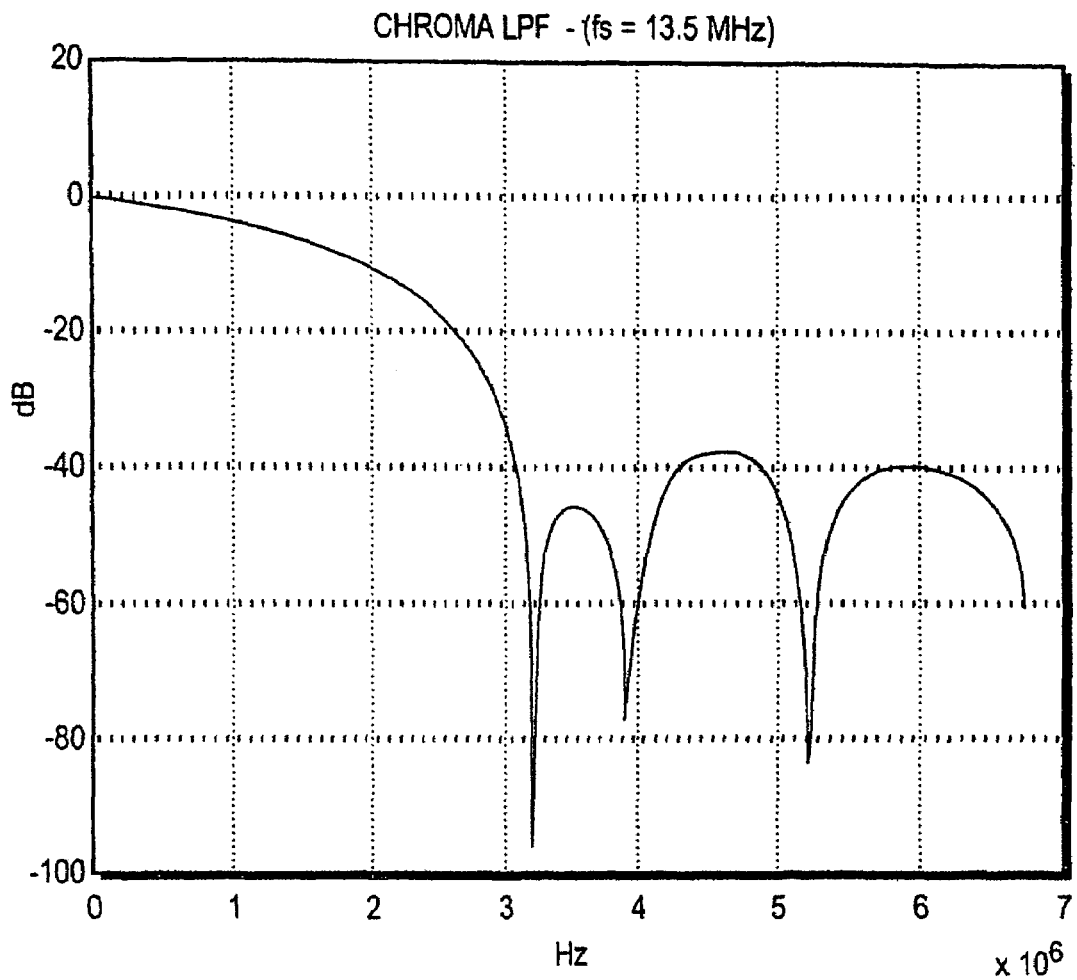
FIG. 28 is a diagram of a transfer curve for a chroma low pass filter according to the present invention.

The transfer curve for a chroma low pass filter according to the present invention is shown in FIG. 28. The chroma filter according to the present invention is an eight tap FIR filter which accepts chroma color difference samples. Since CCDs are a sampled system, the input image is be pre-filtered optically to limit pass band to 6.75 MHZ with fs=13.5 MHZ. However, once the image is converted into an CCD output signal, chroma is limited to 3.375 MHZ, according to one embodiment of the present invention, because of the need to sub-sample chroma at 6.75 MHZ according to a 4:2:2 format. The chroma filter equation is given by $H(Z)=[0.0305*Z^{-1}+0.0903*Z^{-2}+0.1664*Z^{-3}+0.2205*Z^{-4}+0.2205*^{-5}+0.1664*Z^{-6}+0.0903*Z^{-7}+0.0305*Z^{-8}]$, with coefficients quantized as follows:

TABLE 11

| QUANTIZED CHROMA LPF COEFFICIENTS | | |
|---|---|---|
| Floating Point | Quantized | Implementation |
| 0.0305 | 32/1024 | 32 |
| 0.903 | 92/1024 | 64 + 32 + 4 |
| 0.1664 | 168/1024 | 128 + 32 + 8 |
| 0.2205 | 224/1024 | 128 + 64 + 32 |

Figure 29:
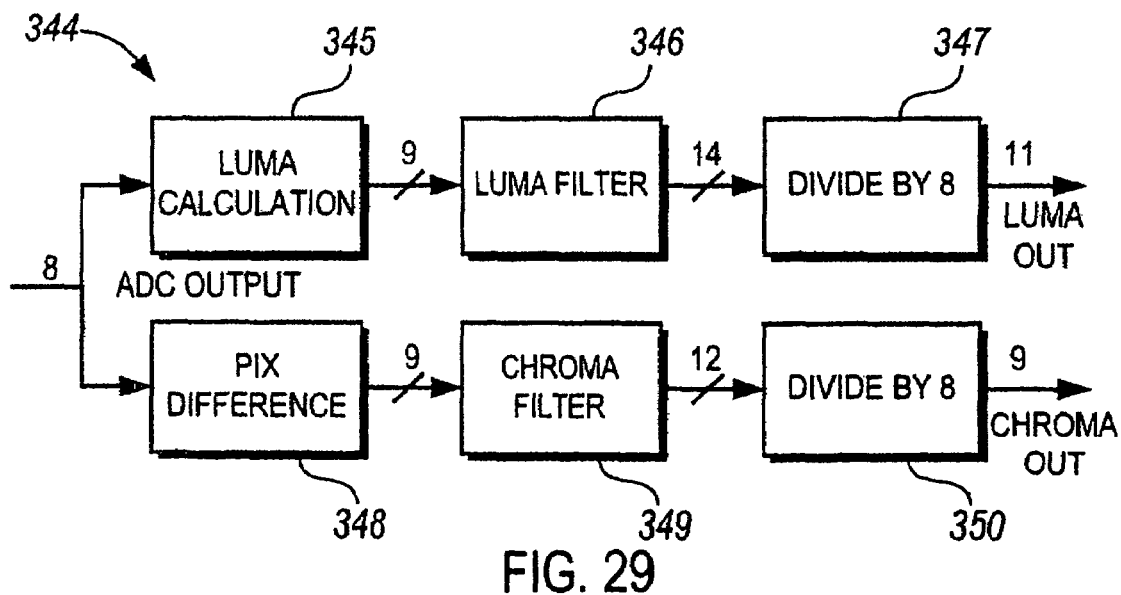
FIG. 29 shows a color separation and filter system according to the present invention.

Word sizes at selected internal nodes of the color separation and filter are shown in FIG. 29. Filter system 344 particularly includes a luma calculation module 345, a luma filter 346, a divide by 8 module 347, a pix difference module 348, a chroma filter 349, and a divide by 8 module 50. The output of deformatter 31 (FIG. 1B) is connected to the input of luma calculation module 345 and pix difference module 348. The outputs of luma calculation module 345 and pix difference module are respectively provided to luma filter 346 and chroma filter 349. The respective outputs of luma filter 346 and chroma filter 349 are respectively connected to divide by 8 modules 347 and 350, to produce respectively a luma output and a chroma output which is provided to YCrCb to RGB converter 33 (FIG. 1B). The luma filter output may contain negative numbers because of the negative coefficients in luma filter 346. These negative luma values are maintained until after the conversion to RGB in YCrCb to RGB converter 33. Any negative numbers in RGB are then be clipped to zero. Color separation and filter module 32 according to the present invention further include a programmable red line/blue line signal, for determining whether a current CCD line is to provide blue or red color difference pixels. This signal is generated in a control block (not shown) which is programmable as to whether the first CCD line is blue or red. Further, according to the present invention, a programmable color difference operation signal (POSPIX) is produced. This signal determines whether the first pixel of the first line from CCD is treated as positive or negative for taking color difference.

The output (luma, blue difference, red difference) of the color separation and filter module 32 is transformed into red, green and blue components by the YCrCb2RGB converter 323. The conversion involves multiplication with a 3×3 matrix, according to one embodiment of the present invention, as shown below:

$$\begin{vmatrix} R \\ G \\ B \end{vmatrix} = \begin{vmatrix} K\_yR & K\_CrR & K\_CbR \\ K\_yG & K\_CrG & K\_CbG \\ K\_yB & KCrB & K\_CbB \end{vmatrix} \begin{vmatrix} Y \\ Cr \\ Cb \end{vmatrix}$$

Figure 30:
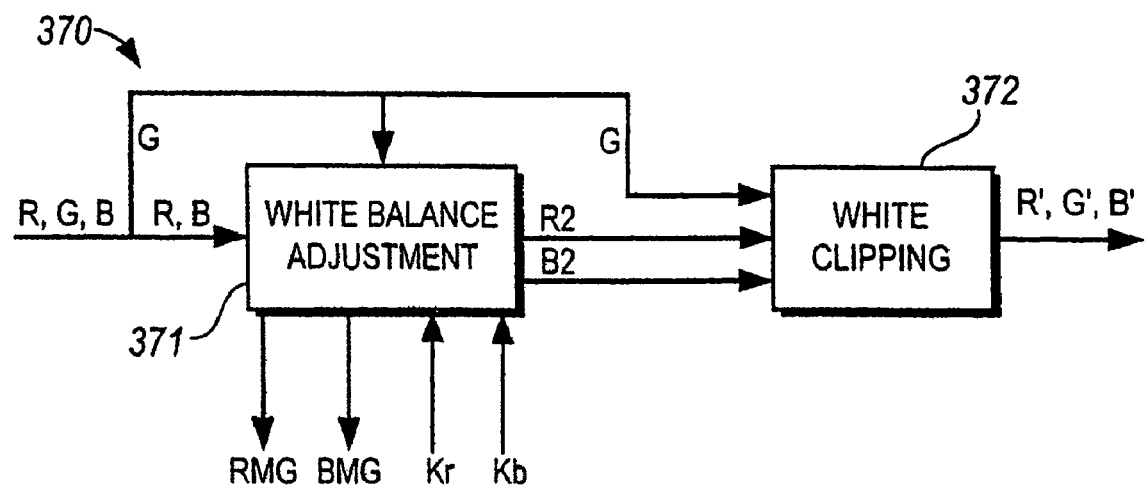
FIG. 30 is a diagram of a white balancing circuit according to the present invention.

The above coefficient values as specified below are settable, according to the present invention, as follows, for example:

K_yR=1; K_CrR=31/16; K_CbR=−1/2;
K_yG+1; K_CrG+−7/16; K_CbG=−9/16;
K_yB=1; K_CrB=−5/16; K_CbB=31/16;

Referring now to FIG. 30, there is shown a diagram of a white balancing circuit according to the present invention. White balancing circuit 370 includes a white balance adjustment circuit 371 and a white clipping circuit 372. White balance adjustment circuit 371 is connected to white clipping circuit 372 with red and blue adjustment value lines, respectively R2 and B2. White balance adjustment circuit 371 receives input red, green, and blue signal value levels, as well as Kr and Kb gain factor values. White balance adjustment circuit 371 produces output signals R2, B2, RMG, and BMG. White clipping circuit 372 receives input signals green, adjusted red, and adjusted blue, respectively G, R2 and B2. White clipping circuit further produces output clipped red, green and blue signal values, respectively R', G', and B'. Ambient white light may, accordingly, be shifted towards bluish or reddish hue based on the characteristics of the light source. This relative shift is often characterized by the color temperature of the light. A low temperature indicates a shift towards red and high temperature indicates a shift towards blue. The objective of the color balancing function is to balance the blue and red components by adjusting their relative gains so that a white object indeed appears as white. The steps required for color adjustment, according to the present invention, include adjusting the red and blue components of the input signal using first and second gain factors values, Kr and Kb, respectively. These factors are computed in a control section (not shown) and vary between 0.5 and 2.5. In particular, R2=(1+Kr)*R1, and B2=(1+Kb)*B1. Further, two color components RMG=(red-green) and BMG=(blue-green) are computed, according to the present invention. These are used by the control block (not shown) in computing Kr and Kb. Further, according to one embodiment of the present invention, the black restored red and blue values are clipped, as well as green, to a maximum binary equivalent of 0.92 (i.e., 235 for an 8 bit sample). The generation of Kr and Kb is accomplished by computing average values of RMG and BMG over a ¼ window in the middle of a selected screen. Kr and Kb registers are then initialized to hex 80, and at the end of each field the value is adjusted up or down based on the average RMG and BMG per field. A final value is determined over eight fields through a process of successive approximation. These registers can also be directly written through the I2C interface.

Figure 31:
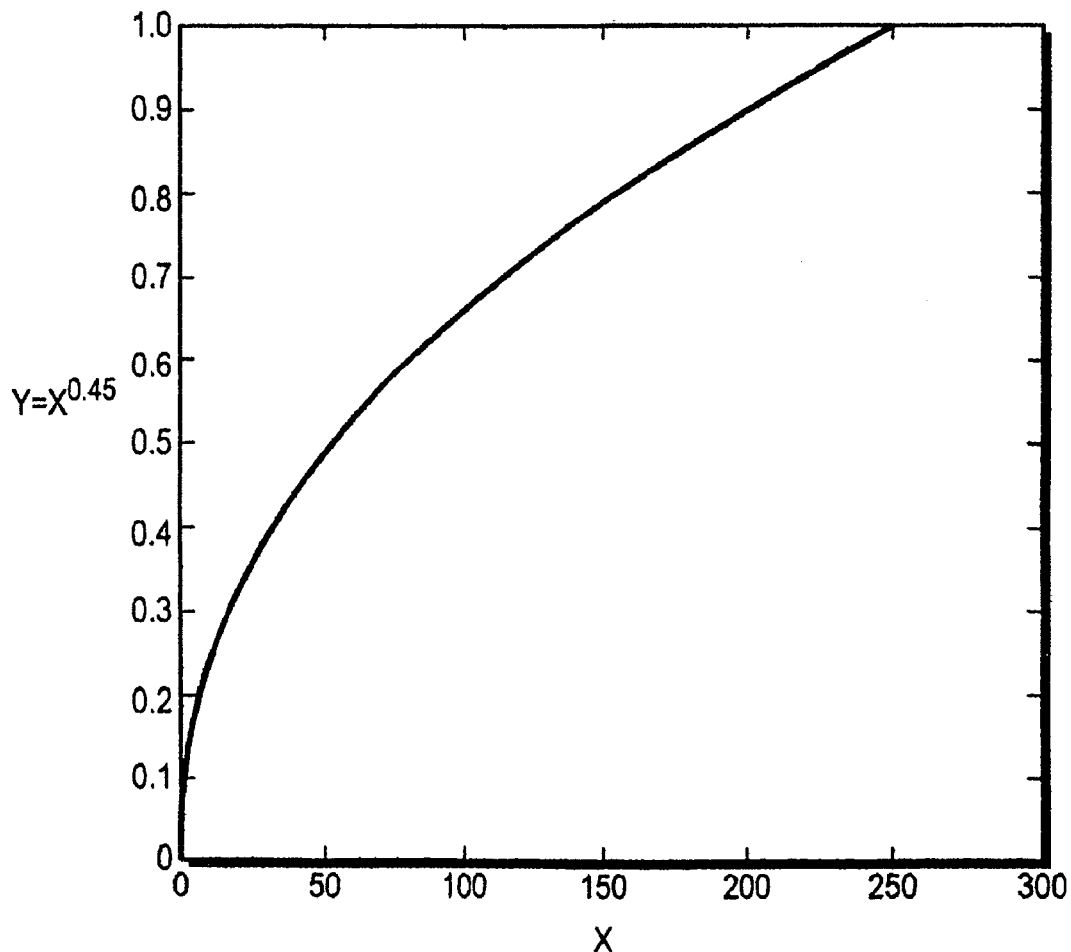
FIG. 31 shows a gamma correction curve according to the present invention.

Referring now to FIG. 31, there is shown a gamma correction curve according to the present invention. Because of the non-linear characteristics (input voltage versus light intensity) of a target CRT display, the CCD output is gamma corrected so that the light intensities of the camera input and CRT output are linearly related. Gamma correction, according to one embodiment of the present invention, is implemented using look-up RAM tables. These tables are user-programmed to contain any desired correction curve.

Figures 32, 33:
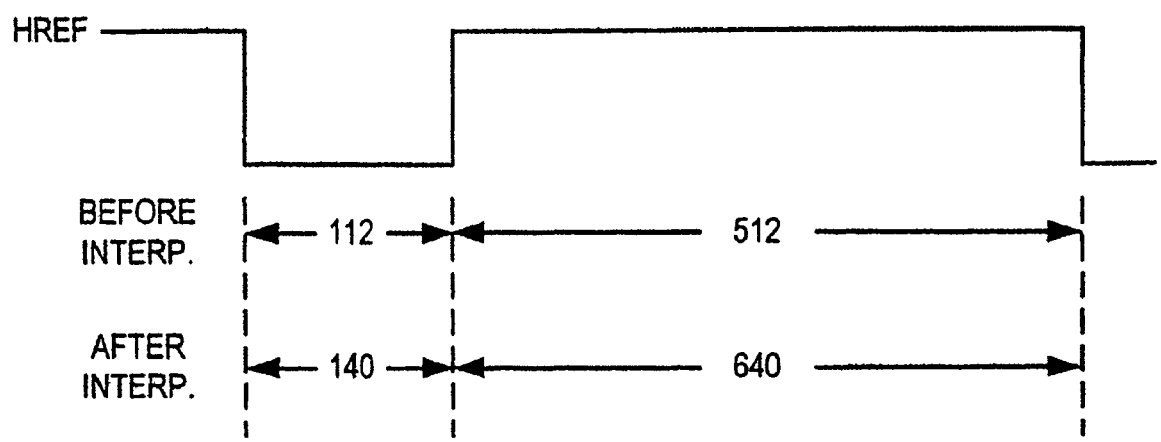
FIG. 32 is a diagram of an RGB to YUV converter 90 according to the present invention.
FIG. 33 is a diagram of an interpolation waveform according to the present invention.

Referring now to FIG. 32, there is shown a diagram of an RGB to YUV converter 36 according to the present invention. The RGB to YUV converter performs a matrix multiplication operation to convert the RGB color components into YUV components.

Referring now to FIG. 33, there is shown a diagram of an interpolation waveform according to the present invention. The YUV output from the color saturation module 37 is interpolated, according to the present invention, to increase the number of pixels by a factor of 5/4. The interpolation operation is selectable by the user through a register bit and is used for generating a 640×480 (active pixels) VGA output from a 512×480 (active pixels) CCD. This requires a 10 MHZ sampling clock before interpolation and a 12.5 MHZ clock after interpolation.

Figure 34:
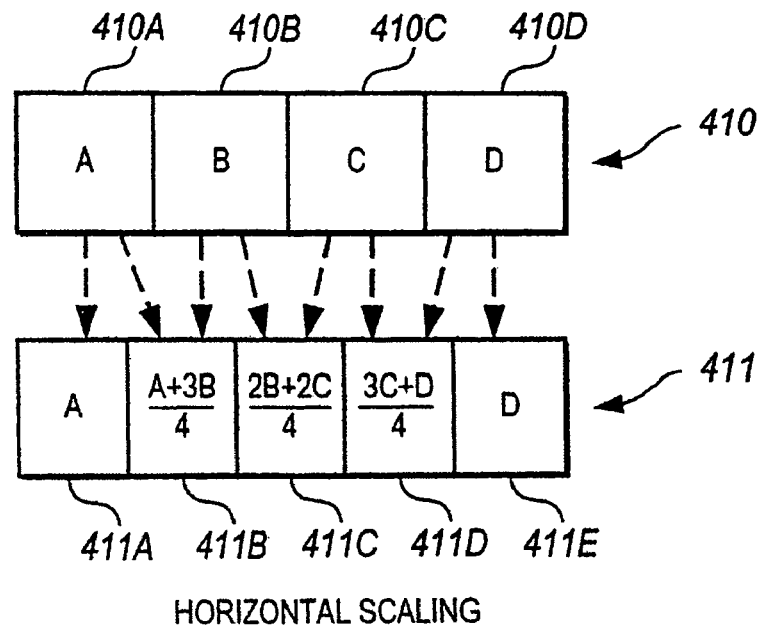
FIG. 34 is a diagram showing a horizontal scaling pattern according to the present invention.

Referring now to FIG. 34, there is shown a diagram showing a horizontal scaling pattern according to the present invention. According to the pattern, the pixel values of a first set, 410, of four registers, respectively 410A-410D, are used to generate pixel values for a second set, 411, of five registers, respectively 411A-411E. In particular, according to the present invention, the values of the first and last registers of the first set 410 are entered into corresponding first and last of the second set 411. Thus, the value of register 410A becomes the value of register 411A; and the value of register 410D becomes the value of register 411E. Further, the value of register 411B is generated by adding ¼ of the value of register 410A to ¾ of the value of register 410B. The value of register 411C is generated by adding ½ of the value of register 410B to ½ of the value of register 410C. Finally, the value of register 411D is generated by adding ¾ of the value of register 410C to ¼ of the value of register 410D. Since the interpolation requires data to go from a 10 MHZ sampling rate to a 12.5 MHZ sampling rate, synchronization, according to the present invention, is employed.

Figure 35:
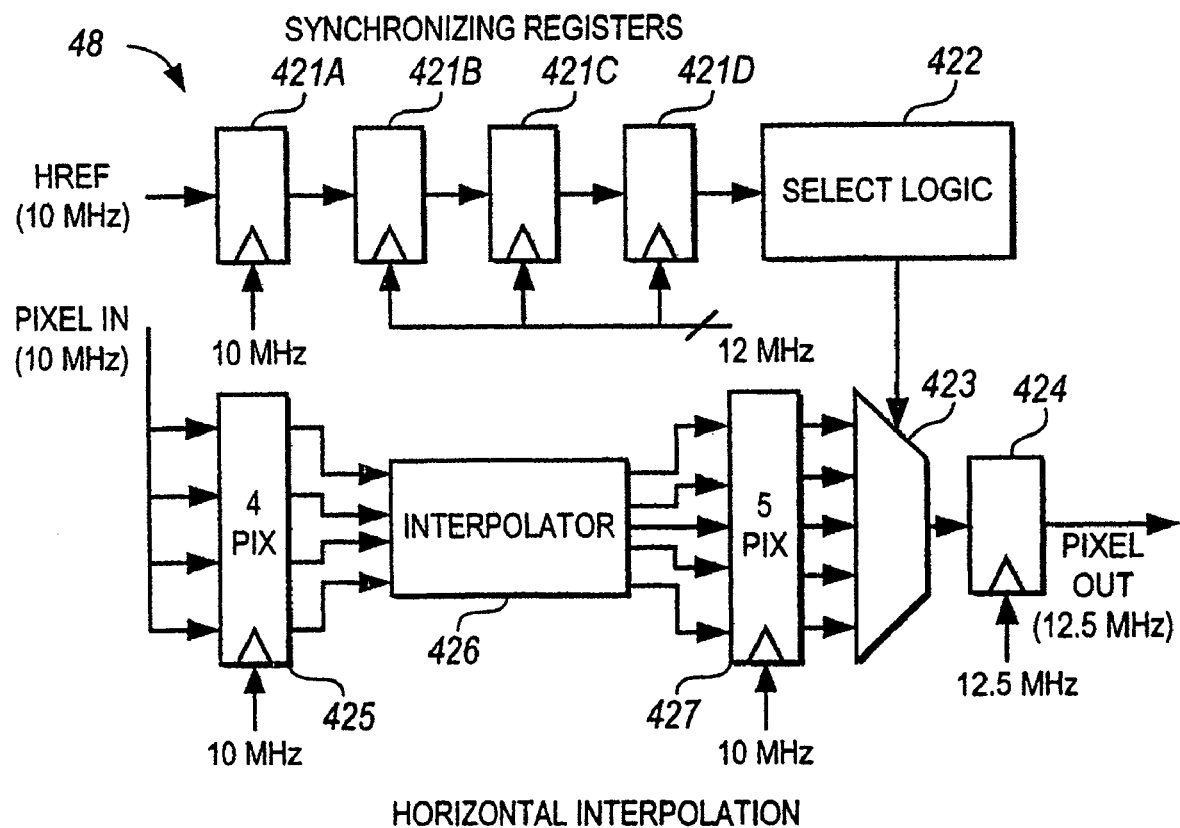
FIG. 35 is a block diagram of a horizontal interpolation system according to the present invention.

Referring now to FIG. 35, there is shown a block diagram of a horizontal interpolation system 48 according to the present invention. The system 48, according to the present invention, insures that the 12.5 MHZ pixel latch always picks a valid, synchronized data. The select logic of interpolation system 338 is reset by the HREF signal according to the present invention. In particular, interpolation system 420 includes a successively interconnected series of first through fourth respective synchronizing registers 421A-421D. First synchronizing register 421A receives an input HREF signal at 10 MHZ and is clocked at 10 MHZ, outputting the HREF signal at clock time to second synchronizing register 421B. Second, third and fourth synchronizing registers, respectively 421B-421D, are clocked at 12.5 MHZ, with the output of the second synchronizing register 421B being applied to the input of the third synchronizing register 421C and the output of the third synchronizing register 421C being applied to the fourth synchronizing register 421D. The output of the fourth synchronizing register is applied to select logic 422 which controls multiplexer 423. Interpolation system 420 further includes a four pixel buffer 425 clocked at 10 MHZ, which receives four input pixel values at a 10 MHZ rate. These four values are provided to interpolation module 426 which provides applicable values to five pixel buffer 427. Multiplexer 423 receives the five pixel values from buffer 427 and provides selected ones thereof to pixel output buffer 424 which is clocked out at 12.5 MHZ.

Figure 36:
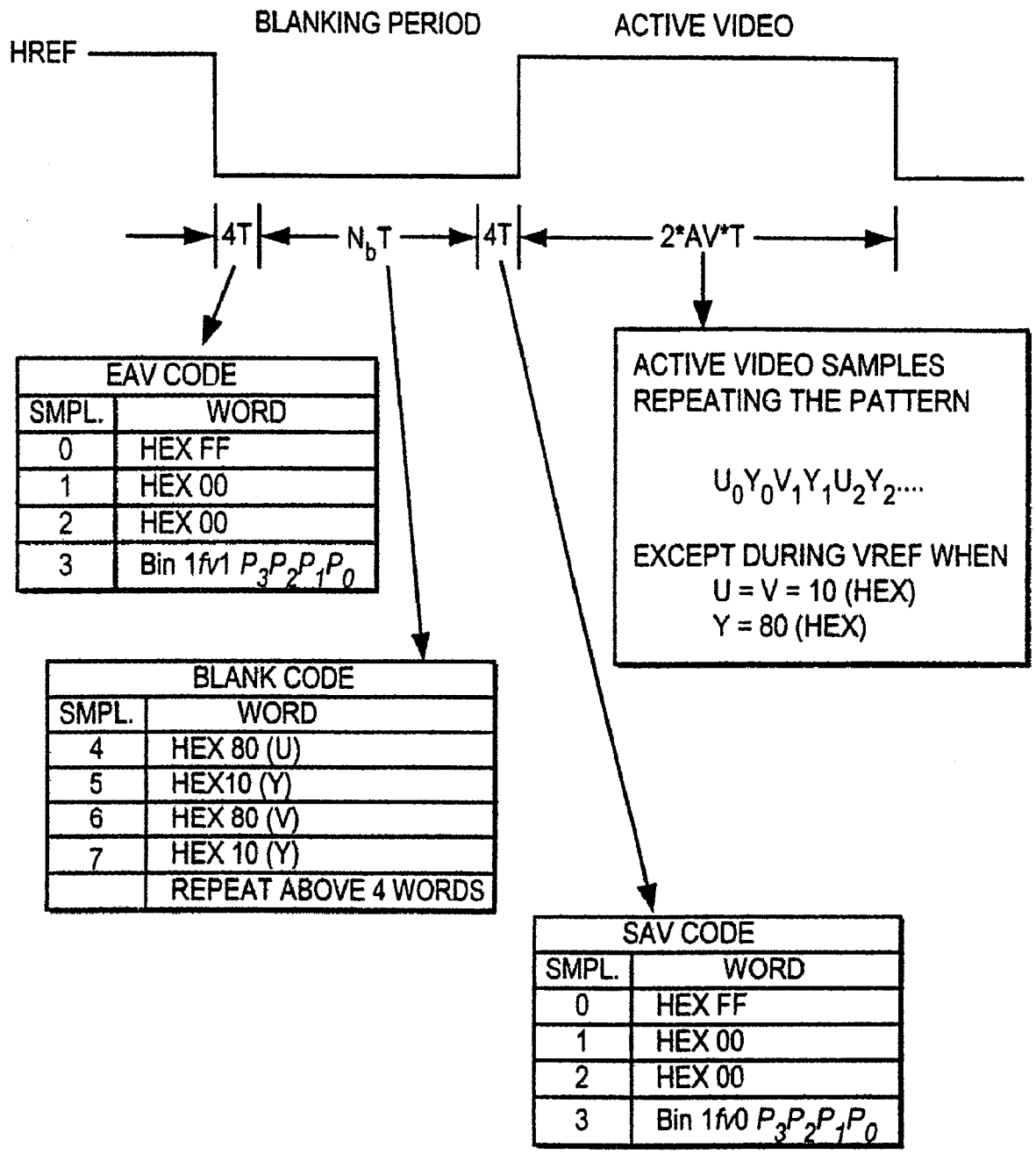
FIG. 36 is a diagram of a video output data format, according to the present invention, for selected portions of the horizontal video line.
Figure 39:
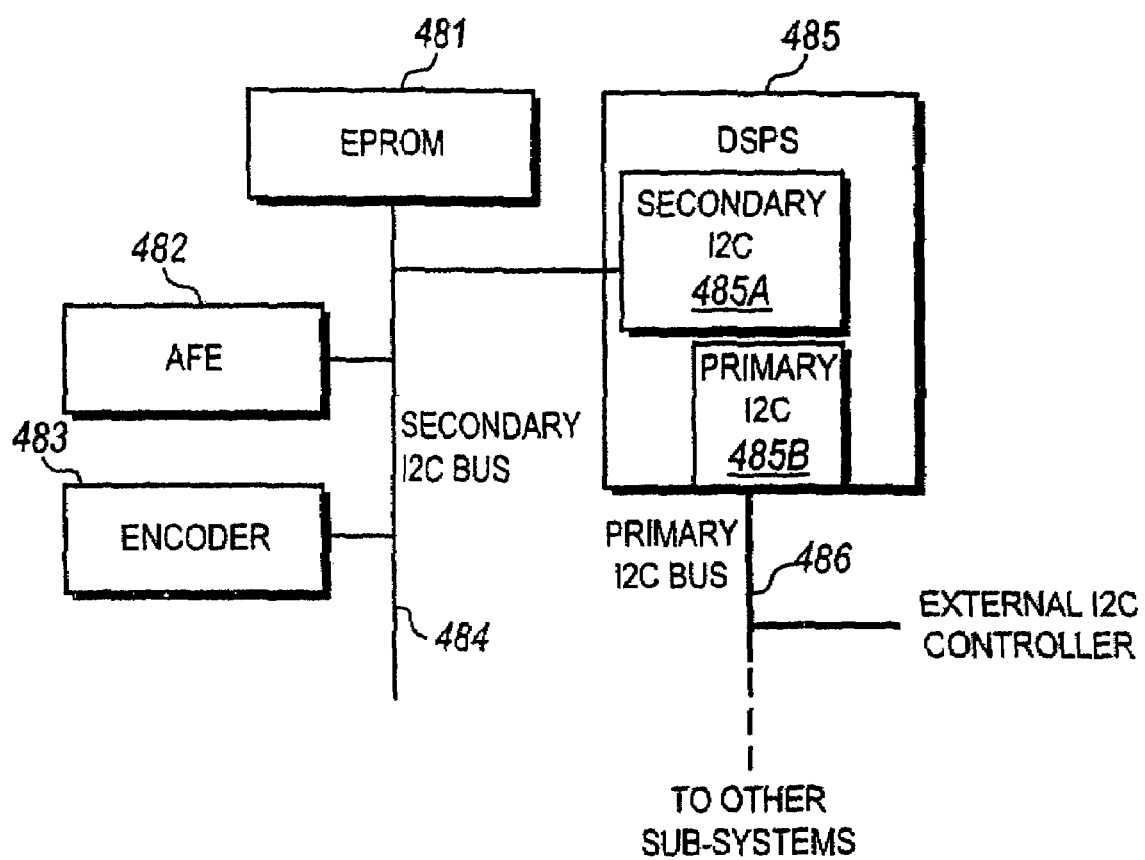
FIG. 39 is a block diagram of primary and secondary I2C bus systems according to the present invention.

Referring now to FIG. 36, there is shown a diagram of a data format, according to the present invention, for portions of the horizontal video line. Values for particular parameters in FIG. 39 are given in Table 12 which follows:

TABLE 12

| | | Horizontal line size (pixels) | | | | |
|---|---|---|---|---|---|---|
| Parameter | Description | 429 | 624 | 780 | 858 | Units |
| 1/T | Output clock frequency | 13.5 | 19.6 | 25 | 27 | MHZ |
| $N_b$ | HREF samples - 8T | 146 | 216 | 272 | 268 | samples |
| AV | Active video samples | 704 | 1024 | 1280 | 1440 | samples |

Figure 37:
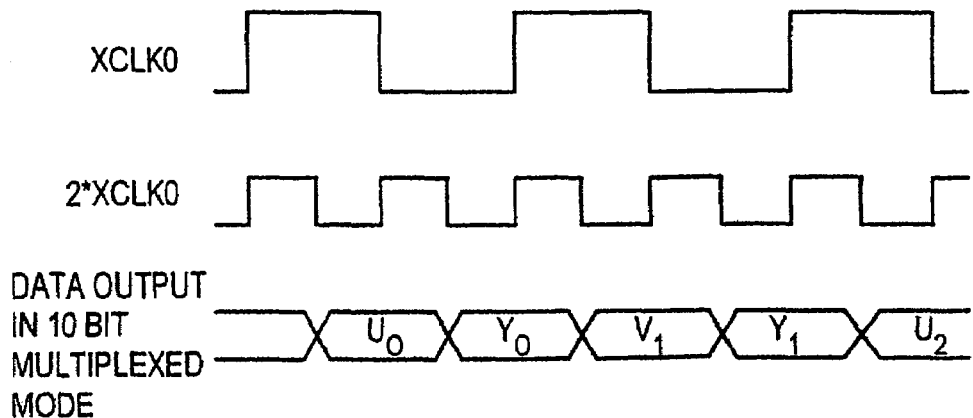
FIG. 37 is a timing diagram for video data out and clock signals according to the present invention.

Referring again to FIG. 37, there is shown a timing diagram for data out and clock signals according to the present invention.

Referring again to FIG. 26, there is shown a timing diagram for complete data transfer on an I2C bus, according to the present invention, to permit parallel operation of multiple CCD cameras. In order to allow multiple cameras to be connected together, according to the present invention, the video data output bus can be put in Hi-Z condition through the setting of a predetermined register bit.

Figure 38:
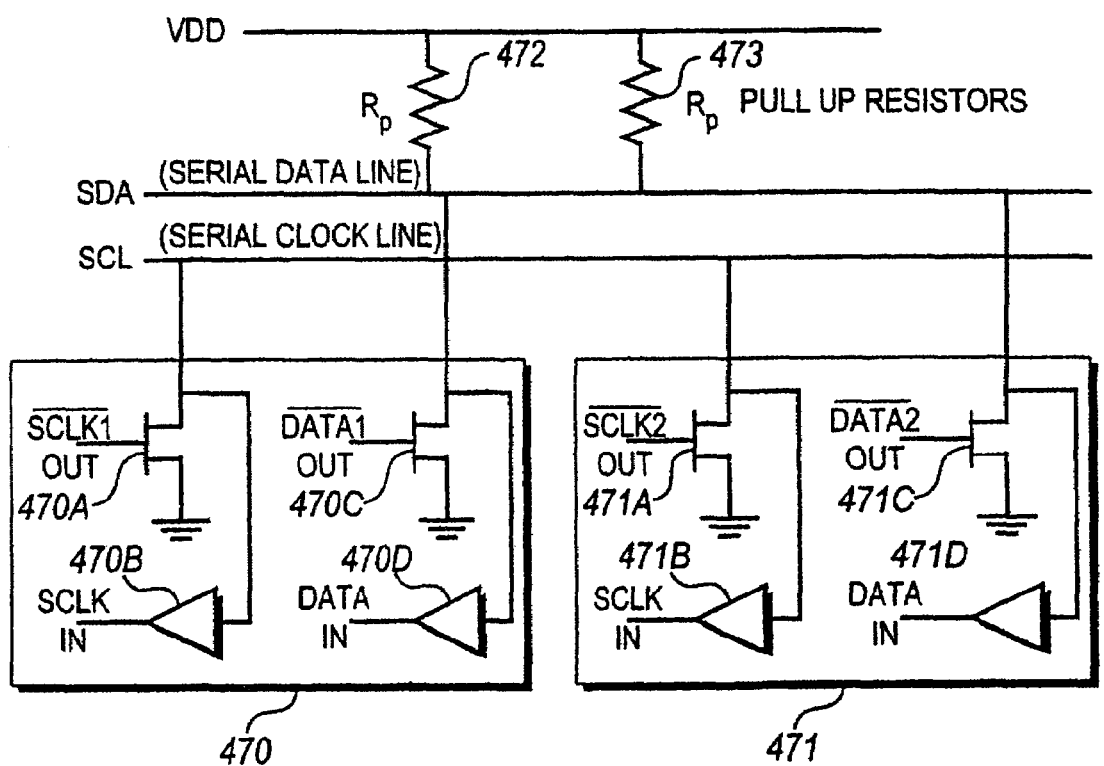
FIG. 38 is a diagram, according to the present invention, of the connection of selected I2C bus devices.

Referring now to FIG. 38, there is shown a diagram, according to the present invention, of the connection of selected I2C bus devices. The DSPS 18, according to the present invention, provides a secondary I2C interface for accessing the internal control and status registers. External pins are a bidirectional data pin (SDA) and a serial input clock (SCL). The protocol follows I2C specifications. These specifications are well known. See, for example, Philips Semiconductors "Desktop Video Data Handbook." The secondary I2C interface works, according to the present invention, in slave mode. In addition, the DSPS 18, according to the present invention, has a simplified master I2C interface for communicating with AFE. Both the serial data line (SDA) and the serial clock line (SCL) are connected via external pull-up resistors Rp (472 and 473) to a positive supply voltage VDD. When the I2C bus is free, both lines are HIGH. The output stages of devices connected to the bus have an open-drain or open-collector, according to the present invention, in order to perform a wired-AND function. Data on the I2C bus is transferred at a rate of up to 400 kbit/sec in fast mode according to the present invention. The number of interfaces to the bus is dependent, in part, on, according to the present invention, limiting bus capacitance of 400 pF.

Referring now to FIG. 39, there is shown a block diagram of primary and secondary I2C bus systems according to the present invention. DSPS 18 has two I2C interfaces: one is a primary interface 486 that is used by an external controller to read or write data from DSPS 18; the second is a simplified master interface which is used by DSPS 18 to communicate with other slave devices such as the camera analog chip (i.e., an AFE), a video encoder chip, etc. This arrangement, according to the present invention, is based on two I2C buses—a secondary bus 484 for the camera system, and a primary bus 486 to be shared with multiple cameras controlled by a single I2C primary controller. In a single camera application, the external camera may connect directly to all the devices. The primary I2C interface of DSPS 18 would not be used in such an application. The EPROM 481 is provided for initializing all the registers on all the devices on secondary I2C bus 484 on reset in a stand-alone application. This includes loading a new station address into each of the devices, provided it can be done by writing to a register location. In a I2C arrangement according to the present invention, communications between external controller and any of the devices on the camera take place through DSPS 18 according to the present invention. The external I2C controller accesses registers on any of selected devices through DSPS 18 according to the present invention. The external controller sends, for example, a 4 byte command to DSPS 18 including a DSPS station address, according to the present invention, destination device station address, and a desired register address of the destination device followed by data, if it is a write operation. DSPS 18 then completes the required transaction with the destined device. According to the present invention, the external controller sends 4 bytes, with the DSPS 18 station address repeated in the first 2 bytes, even when accessing registers on DSPS 18. In applications where the DSPS 18 is not used as an I2C gateway for slave devices, DSPS 18 can be set to a mode where it is needs only 3 bytes (the DSPS 18 station address, its register address, and data) to access registers on the DSPS 18. The descriptions below assume DSPS 18 is in a 4-byte mode. In a 3-byte mode, the destination station address is not required.

In a diagram of an EPROM map for initialization of DSPS registers according to the present invention, an end of reset triggers a DSPS to download register values in any of selected attached devices from the EPROM. In particular, DSPS 18 goes out and fetches 3 bytes from the EPROM 481. These 3 bytes represent destination station address, register address, and data. DSPS 18 then writes the data into the specified register of the destined station. After completing this process, DSPS 18 goes out and reads the next 3 bytes from EPROM 481. The number of register data to be read from the EPROM 481 is loaded into a 2-byte count register in DSPS 18. The top 6 bytes in the EPROM specify the number of triple bytes to be read from EPROM 481. During the time DSPS 18 is doing initialization from EPROM 481, an INITACT bit is set in the status register of DSPS 18. Attempts to write to DSPS registers by an external controller are ignored during this time. The only exception to the above rule is when accessing data for the gamma RAM on DSPS 18.

Write operations from an external controller to any secondary device via DSPS 18 require the following operations. The external controller sends a 4-byte write command to DSPS 18. DSPS 18 initiates a write operation to a selected destination slave device and sets the I2CBUSY bit in the appropriate status register. The external controller polls the status register to check if DSPS 18 has completed the command.

DSPS 18 has a command buffer which allows an external controller to queue an additional command while the current command is still being executed. If more than one command is sent before the I2CBUSY bit is cleared, DSPS 18 saves only the last command and executes it after the current one is completed. Commands that involve writing or reading only to DSPS 18 registers are not put in the queue and are executed immediately without affecting any transactions going on in the master I2C interface. Any attempt to write data to one of the DSPS 18 registers from an external controller while DSPS 18 is busy initializing from EPROM 481 will be ignored. However, reads from DSPS 18 are allowed. If during a read or write operation to a slave device DSPS 18 fails to receive an acknowledge bit, the execution of the command is aborted and the NODEV bit in the status register is set. This bit remains set unless it is explicitly cleared by writing to it or a new command is written to DSPS 18.

Read operations from the external controller via DSPS 18 require a 4-byte command, according to the present invention, (when 4BYTEMODE pin is tied low) similar to the write operation described above. The behavior of I2CBUSY bit is also similar to what it is during write command. The read format consists of two bytes. The first byte is the device address with the direction bit set to "1" in order to indicate a "read." The DSPS chip then sends one byte back on the bus, from the register which was addressed by the last write format or address set format.

The address set format consists of a 2 byte packet. The first byte is the device address with the data direction bit set to "0" in order to indicate a "write." The second byte is the register address. The address set format is the same as a write format, however, the register data is not sent. It is used to set the address for the read format.

The I2C station addresses for both AFE 482 and DSPS 18 can be changed, according to the present invention, through the I2C interface. Location FF, for example, holds the station address for DSPS 18 and FE holds the station address for AFE 482. Once a station address is changed, all subsequent I2C accesses use the new station address.

The status register (01h) on DSPS 18 contains 3 bits related to the I2C interfaces:

(1) bit 0: NODEV—If DSPS fails to get an acknowledge from a slave device, the NODEV bit is set. It is cleared by writing to the register or if DSPS starts a new read/write transaction with a slave device.

(2) bit 1: I2CBUSY—This bit is set when DSPS 18' master I2C interface is active talking with a selected of the slave devices. It is cleared when, according to the present invention, a transaction is completed or DSPS 18 fails to receive an acknowledge.

(3) bit 2: INITACT—Upon reset, DSPS 18 starts initializing all its own registers as well as the ones on slave devices. The INITACT bit is set during this process and is cleared when initialization is done.

DSPS 18 outputs data compatible with ZV port specifications according to one embodiment of the present invention. This mode is enabled by a register control bit called ZVMODE at register hex 06. The VREF output pin normally outputs the vertical blanking signal, but when ZVMODE bit is set, it outputs a VSYNC signal. The following register list shows registers for both the AFE 482 and DSPS 18 chips.

TABLE 13

| Register (hex) | Register name | Access | Default Value | Comments |
| --- | --- | --- | --- | --- |
| 00h | Reset | W | 00 | bit 0 = 1 for Argus reset bit 4 = 1 for Gorgon reset Bit is automatically cleared |
| 01h | Status | R | 00h | |
| 02h | Reserved | R | 00h | |
| 03h | Digital gain | R/W | 08h | 1 |
| 04h | Brightness | R | NA | |
| 05h | Feature control | R/W | 00h | |
| 06h | Operation control | R/W | 0Dh | |
| 07h | Reserved | | | |
| 08h | Red balance | R/W | 80h | 1 |

TABLE 13-continued

| Register (hex) | Register name | Access | Default Value | Comments |
| --- | --- | --- | --- | --- |
| 09h | Blue balance | R/W | 80h | 1 |
| 0Ah | Red saturation | R/W | 80h | 1 |
| 0Bh | Blue saturation | R/W | 80h | 1 |
| 0Ch | Gamma correction | R/W | 01h | |
| 0Dh | Reserved | R | 00h | |
| 0Eh | Test control register A | R/W | 00h | |
| 0Fh | Test control register B | R/W | 00h | |
| 10h | K_yR | R/W | 80h | 2 |
| 11h | K_CrR | R/W | 7Ch | 31/16 |
| 12h | K_CrR | R/W | E0h | −8 |
| 13h | K_yG | R/W | 80h | 2 |
| 14h | K_CrG | R/W | E4h | −7/16 |
| 15h | K_CbG | R/W | DCh | −9/16 |
| 16h | K_yB | R/W | 80h | 2 |
| 17h | K_CrB | R/W | ECh | −5/16 |
| 18h | K_CbB | R/W | 7Ch | 31/16 |
| 19h | Slave data register | R | 00h | Slave data register cannot be written by external controller |
| 1Ah | EPROM count —low byte | R/W | FFh | Indicates how many triple bytes must be read from EPROM upon reset. |
| 1B | EPROM count —high byte | R/W | FFh | |
| 1C | Version (major) | R | FFh | FF is the code for revision A |
| 1D | Version (minor) | R | 00h | 00 is the code for revision A |
| 1E-1F | Reserved | R | 00h | |
| 20h | Power down | R/W | 00 | bit 0 = 1 for Argus power down bit 4 = 1 for Gorgon power down |
| 21h | Test enable | R/W | 00 | bit 0 = 1 for Argus test enable bit 4 = 1 for Gorgon test enable |
| 22h | Test control register | R/W | 00 | |
| 23 | Version | R | 00 | |
| 24h | Operational control | R/W | 00 | |
| 25h | Reserved | R | 00 | |
| 26h | Analog gain | R/W | 00 | |
| 27h | Shutter | R/W | 00 | |
| 28h | Brightness | R | 00 | |
| 29h-2Fh | Reserved | R | 00h | |
| 30h-3Fh | Timing control | R/W | | |
| 40h-4Fh | Timing control | R/W | | |
| 50h-55h | Timing control | R/W | | |
| 56h-FDh | AFE station address | R/W | 54h | |
| FEh | Gorgon's station address | R/W | 54h | |
| FFh | Argus' station address | R/W | 34 | |

Reset—00h. Writing a 1 to bit 0 at location 00h triggers a software reset in DSPS 18. Similarly, writing a 1 to bit 4 at location 00h triggers a software reset in AFE 482 chip. The bit automatically clears. The reset stays active for 32 cycles of CLKIN.

TABLE 14

| Bit | Name | Access | Default | Description |
|-----|------|--------|---------|-------------|
| 0 | Reset_dig | R/W | 0 | Writing a 1 resets the part. Behaves identical to reset pin. |
| 1-3 | Reserved | R | 0 | |
| 4 | Reset_ana | R/W | 0 | Writing a 1 resets the part. |
| 5-7 | Reserved | R | 0 | |

The following actions take place on either the register reset or the pin reset:
1. All registers go back to default values.
2. If an external EPROM is hooked with the local I2C bus, the EPROM data is downloaded into specified device registers at the end of reset.

Register 01h—status. This register is read only.

TABLE 15

| Bit | Name | Access | Default | Description |
|-----|------|--------|---------|-------------|
| 0 | EVNFLD | R | — | 1 indicates even field. |
| 1 | NODEV | R | 0 | 1 indicates that the addressed slave device on local I2C bus did not respond. |
| 2 | I2CBUSY | R | 0 | 1 indicates that DSPS master I2C is still busy accessing the addressed slave device. |
| 3 | INTACT | R | 0 | 1 indicates that DSPS master I2C is busy initializing registers from EPROM. |
| 4-7 | Reserved | | | |

Bit 0 (even field) is provided as a means of synchronizing to the vertical camera rate. The bit is read as a "1" during even fields and as a "0" during odd fields.

Register 1Ch—Version (major). This register is read-only. Data=FF for revision A.

TABLE 16

| Bit | Name | Access | Default | Description |
|-----|------|--------|---------|-------------|
| 0-3 | | R | F | |
| 4-7 | | R | F | |

Register 1Dh—Version (minor). This register is read-only. Data=00 for revision A.

TABLE 17

| Bit | Name | Access | Default | Description |
|-----|------|--------|---------|-------------|
| 0-3 | | R | 0 | |
| 4-7 | | R | 0 | |

Digital gain—03h. This register controls the digital gain applied to the luma signal after the RGB2YUV block. The gain value varies from 0 to $3\frac{1}{8}$ in increments of $\frac{1}{8}$.

TABLE 18

| Bit | Name | Access | Default | Description |
|-----|------|--------|---------|-------------|
| 0-4 | DIG_GAIN | R/W | 00h | 00h = 0 (no brightness), 08h = 1, 1Fh = 31/8 |
| 5-7 | Reserved | | | |

Brightness—04h. [not used] This register contains the maximum value of the low-pass filtered luminance signal. It changes at field rate. When AGC is enabled, the AGC circuit attempts to keep this value at 0EBh (235).

Feature control—05h.

TABLE 19

| Bit | Name | Access | Default | Description |
|-----|------|--------|---------|-------------|
| 0 | AGCEN | R/W | 0 | Automatic gain control enable for DSPS' AGC if implemented. |
| 1 | AWBCTL | R/W | 0 | Automatic white balance control. This bit is set by writing a "1". Writing a "0" has no effect. This bit is read as a "1" while AWB is in progress (it takes about 160 msec.). While AWB is in progress, AGC is disabled if implemented. This bit is read as a "0" when AWB is not in progress. |
| 2 | GAMMAON | R/W | 0 | Default is gamma correction disabled. |
| 3 | LUMAOFF | R/W | 0 | Default is high pass luma filter enabled. |
| 4 | CHRMOFF | R/W | 0 | Default is low pass chroma filter enabled. |
| 5 | AGCWIN | R/W | 0 | Select full window when set to 1 for AGC peak. Select center ¼ window by default. Applies to devices where AGC is implemented. |
| 6-7 | Reserved | R | 0 | |

DSPS operational control—06h

TABLE 20

| Bit | Name | Access | Default | Description |
|-----|------|--------|---------|-------------|
| 0 | OBLUELINE | R/W | 1 | Blue line/red line indicator for odd field. This bit determines if the first line after VREF provides blue line color difference pixels ("1") or if it provides red line color difference ("0"). |
| 1 | EBLUELINE | R/W | 0 | Blue line/red line indicator for even field. This bit determines if the first line after VREF provides blue line color difference pixels ("1") or if it provides red line color difference pixels (")"). |
| 2 | POSPIX | R/W | 1 | Color difference operation signal for odd field. This bit determines if the first pixel of the first line from the CCD is treated as a positive signal or if it is treated as the negative pixel in the color separation block. |
| 3 | HIZDOUT | R/W | 1 | Puts DOUT bus in Hi-Z state for parallel operation of multiple cameras. Hi-Z enabled when set to 1 (see notes). |
| 4 | INREF | R/W | 0 | HREF and VREF become input pins. EAV and SAV codes in data stream are ignored. |
| 5 | DVCI | R/W | 0 | Data output is in 8 bit DVCI mode when set. |
| 6 | ZVMODE | R/W | 0 | ZV mode output enabled when set. |
| 7 | Reserved | R | 0 | |

Note on HIZDOUT:
the HIZDOUT bit and the HIZENB pin both affect the output pin tri-state conditions in the following manner. The I2C interface pins never go into Hi-Z mode.

TABLE 21

| HIZDOUT bit | HIZENB pin | Effect on Output Pins (XOR) |
|---|---|---|
| 0 | 0 | Active |
| 0 | 1 | Hi-Z enabled |
| 1 | 0 | Hi-Z enabled |
| 1 | 1 | Active |

Red balance—08h. This register controls the red contribution to the R-Y chrominance signal. When it is 00h, the red contribution is minimized. When it is FFh, the red contribution is maximized. When AWB is in progress, this value is adjusted so that the absolute magnitude of the R-Y is minimized.

TABLE 22

| Bit | Name | Access | Default | Description |
|---|---|---|---|---|
| 0-7 | RBAL | R/W | 00h | This is the gain factor for the R-Y component used for white balancing. |

Blue balance—09h. This register controls the blue contribution to the B-Y chrominance signal. When it is 00h, the blue contribution is minimized. When it is FFh, the blue contribution is maximized. When AWB is in progress, this value is adjusted so that the absolute magnitude of the B-Y is minimized.

TABLE 23

| Bit | Name | Access | Default | Description |
|---|---|---|---|---|
| 0-7 | BBAL | R/W | 00h | This is the gain factor for the B-Y component used for white balancing. |

This register controls the amplitude of the final R-Y chrominance signal. At 00h, the amplitude of the R-Y signal is minimized. When it is FFh, the amplitude of the R-Y signal is maximized. A value of 80h sets the saturation to 1.

TABLE 24

| Bit | Name | Access | Default | Description |
|---|---|---|---|---|
| 0-7 | RSAT | R/W | 80h | This is the gain factor for the R-Y component in the final output signal. |

Blue saturation—OBh. This register controls the amplitude of the B-Y chrominance signal. At 00h, the amplitude of the B-Y signal is minimized. When it is FFh, the amplitude of the B-Y signal is maximized.

A value of 80h sets the saturation to 1.

TABLE 25

| Bit | Name | Access | Default | Description |
|---|---|---|---|---|
| 0-7 | BSAT | R/W | 80h | This is the gain factor for the B-Y component in the final output signal. |

Gamma Correction—0Ch. The gamma correction register provides access to the R, G and B gamma look-up table RAMs. The procedure for write and read-access to all the 255 locations on each of the gamma RAM is shown below.

The diagram shows the mode where register access through I2C requires three bytes (station address, register address, data). 4-byte mode access requires an additional byte in the beginning where the station address is repeated.

TABLE 26

| Bit | Name | Access | Default | Description |
|---|---|---|---|---|
| 0 | GAMMA BLUE | R/W | 1h | Selects blue gamma RAM for subsequent RAM accesses. |
| 1 | GAMMA GREEN | R/W | 0h | Selects green gamma RAM for subsequent RAM accesses. |
| 2 | GAMMA BLUE | R/W | 0h | Selects red gamma ram for subsequent ram accesses. |
| 3-7 | Reserved | | | |

Writing to the gamma register (0C) selects the R, G and/or B RAM. Continuing data writes without sending a stop bit after the register write results in writes to RAM location starting from location 00h. Reads from register 0Ch function in a similar way. All three gamma RAMs may be selected for simultaneously writing to them. Reading of the RAMs, however, should be done one at a time.

Test register A-0Eh. Select test modes for Argus.

TABLE 27

| Bit | Name | Access | Default | Description |
|---|---|---|---|---|
| 0 | INCONT | R/W | 0 | Configures all input pins for continuity test. |
| 1 | OCONT | R/W | 0 | Configures all bidirectional pins for input continuity test. |
| 2 | RAMWR | R/W | 0 | Enables writing of COL_SEP block input data into FIFO RAM. |
| 3-7 | Reserved | | | |

Test register B-0Fh. Specifies which test point in DSPS is observable on the output port of DSPS.

TABLE 28

| TEST REGISTER B (0F hex) | |
|---|---|
| Bits [3–0] | Observation Point |
| 0000 | Normal Y, U, V output |
| 0001 | FIFO RAM output |
| 0010 | Color separation Y output |
| 0011 | Color separation Cr output |
| 0100 | Color separation Cb output |
| 0101 | Gamma corrected R output |
| 0110 | Gamma corrected G output |
| 0111 | Gamma corrected B output |
| 1000 | R gamma RAM output |
| 1001 | G gamma RAM output |
| 1010 | B gamma RAM output |
| 1011-1111 | Unused |

Color conversion coefficients—10h-18h. These represent the nine coefficients for the 3×3 matrix used to convert from YCrCb to RGB.

Power down control—20h.

TABLE 29

| Bit | Name | Access | Default | Description |
|---|---|---|---|---|
| 0 | PDN_DIG | R/W | 0 | Enable power down mode of digital chip. |
| 1-3 | Reserved | R | 0 | |

TABLE 29-continued

| Bit | Name | Access | Default | Description |
|---|---|---|---|---|
| 4 | PDN_ANA | R/W | 0 | Enable power down mode of analog chip. |
| 5-7 | Reserved | R | 0 | |

Test enable—21h.

TABLE 30

| Bit | Name | Access | Default | Description |
|---|---|---|---|---|
| 0 | TSTEN_DIGT | R/W | 0 | Enable test mode of digital chip. |
| 1-3 | Reserved | R | 0 | |
| 4 | TSTEN_ANA | R/W | 0 | Enable test mode of analog chip. |
| 5-7 | Reserved | R | 0 | |

Test modes. The DSPS system, according to the present invention, has several test modes which allow controllability and observability of internal circuits. Most of the tests are enabled by TESTPINB (pin) and TESTENB (register bit). In addition, a specific test bit corresponding to the desired test must be enabled by setting the appropriate test register bit. However, two of the tests, (I) parallel access to I2C registers, and (ii) parallel access to gamma RAM, are enabled only through pins. This also allows direct loading of the registers and gamma RAM for a non-PC, stand-alone-type application. The test modes are listed below:

1. Ability to observe selected nodes (through test register 0Fh) on DOUT bus.
2. Ability to write and read all I2C registers and gamma RAM through a parallel port composed of DIN pins operated in bidirectional mode.
3. Ability to write to FIFO RAM data that is input to COL_SEP block and also directly observe output from RAM.
4. Input and output pins can be configured for continuity test through bits 0 and 1 of register 0Eh.

Parallel access of I2C registers and gamma RAM. Argus allows parallel access of I2C registers and gamma RAM for testing purposes.

TABLE 31

PARALLEL ACCESS OF REGISTERS IN TEST MODE

| Normal pin function | Redefined pin function | Type | Description |
|---|---|---|---|
| DIN [7-0] | ADDRS [7-0] | 1 | Register address |
| DIN8 | SELREG | 1 | Select register address space |
| DIN9 | SELRAM | 1 | Select gamma RAM address space |
| DOUT9 | RDB | 1 | Parallel mode read strobe |
| DOUT8 | WRB | 1 | Parallel mode write strobe |
| DOUT [7-0] | TDAT | B | Parallel data input/output |
| TPARENB | TPARENB | 1 | Enables parallel access. TSTPINB must also be enabled. |

Data is written into the I2C registers by the rising edge of a WRB provided address which is already valid. Valid output data appears on TDAT corresponding to the input address when RDB becomes active low.

TABLE 32

PIN LIST FOR DSPS

| Pin # | Signal Name | Signal Type | Interface Type | Description |
|---|---|---|---|---|
| 1 | 4BYTMODE | 1 | CMOS | Sets the Argus slave I2C interface in 4 bytes per write transaction mode. |
| 2 | DOUT19 | | | |
| 3 | DOUT18 | | | |
| 4 | DOUT17 | | | |
| 5 | DOUT16 | | | |
| 6 | DOUT15 | | | |
| 7 | DOUT14 | 0 | CMOS 16 mA | 4:2:2 YUV data output. |
| 8 | DOUT13 | | | |
| 9 | DOUT12 | | | |
| 10 | GND2 | | | |
| 11 | VDD2 | | | |
| 12 | DOUT11 | | | |
| 13 | DOUT10 | | | |
| 14 | DOUT9 | | | |
| 15 | DOUT8 | | | |
| 16 | DOUT7 | | | |
| 17 | DOUT6 | | | |
| 18 | DOUT5 | | | |
| 19 | DOUT4 | | | |
| 20 | DOUT3 | | | |
| 21 | GND3 | | | |
| 22 | VDD3 | | | |

TABLE 32-continued

PIN LIST FOR DSPS

| Pin # | Signal Name | Signal Type | Interface Type | Description |
|---|---|---|---|---|
| 23 | DOUT2 | | | |
| 24 | DOUT1 | | | |
| 25 | DOUT0 | | | |
| 26 | VDD4 | | Supply | |
| 27 | GND4 | | Ground | |
| 28 | SDAS | B | CMOS O.D. 8 mA | Slave 12C data pin (bidirectional) |
| 29 | SCLS | 1 | CMOS | Slave 12C bus control |
| 30 | HREFOB | 0 | CMOS 8 mA | Output HREF signal |
| 31 | VREFOB | 0 | CMOS 8 mA | Output VREF signal |
| 32 | HREFIB | 1 | | Input HREF signal |
| 33 | VREFIB | 1 | | Input VREF signal |
| 34 | RSTB | 1 | CMOS Schmitt | Reset pin; may be connected to external power-on-reset circuit. |
| 35 | DIN9 | B | CMOS 4 mA | Digital video input data from Gorgon. Data is in mosaic form encoded in CCIR 656 like format. Also used as parallel I/O bus for accessing 12C registers and gamma RAM during test mode. |
| 36 | DIN8 | | | |
| 37 | DIN7 | | | |
| 38 | DIN6 | | | |
| 39 | DIN5 | | | |
| 40 | GND5 | | Ground | |
| 41 | VDD5 | | Supply | |
| 42 | DIN4 | B | CMOS 4 mA | Digital video input data from AFE. Data is in mosaic form encoded in CCIR 656 like format. Also used as parallel I/O bus for accessing 12C registers and gamma RAM during test mode. |
| 43 | DIN3 | | | |
| 44 | DIN2 | | | |
| 45 | DIN1 | | | |
| 46 | DIN0 | | | |
| 47 | SDA | B | CMOS O.D. 8 mA | Master 12C data pin (bidirectional) |
| 48 | SCL | 0 | CMOS 8 mA | Master 12C bus control |
| 49 | | N.C. | | Unused - connect to ground |
| 50 | | N.C. | | Unused - connect to ground |
| 51 | | N.C. | | Unused - connect to ground |
| 52 | | N.C. | | Unused - connect to ground |
| 53 | SCANMODE | 1 | CMOS | Is tied high during scan test. Puts chip in scan mode. For example, bypasses clock buffer and reset. |
| 54 | INTERP | 1 | CMOS | Selects interpolation mode |
| 55 | CLKIN | 1 | CMOS | Chip input clock = 2 × pixel clock |
| 56 | CLKIN2X | 1 | CMOS | Chip clock = 2 × or 2 × 5/4 pixel clock |
| 57 | GND1 | 1 | Ground | |
| 58 | VDD1 | | Supply | |
| 59 | CLKOUT | 0 | CMOS 15 mA | 2 × or 2 × 5/4 output data clock. |
| 60 | TESTPINB | 1 | CMOS | Test pin for enabling test mode |
| 61 | TPARENB | 1 | CMOS | Enables exterior parallel mode access to registers and gamma RAM. |

TABLE 32-continued

PIN LIST FOR DSPS

| Pin # | Signal Name | Signal Type | Interface Type | Description |
|---|---|---|---|---|
| 62 | FIELD | 1 | CMOS | Field indication. Changes on the fourth horizontal line in each field. Odd field: FIELD = 0 Even field: FIELD = 1 |
| 63 | HIZENB | 1 | CMOS | Test pin for putting all output pins in Hi-Z mode. Works in conjunction with HIZDOUT bit. |
| 64 | SCENBL | 1 | CMOS | Controlled by ATPG during scan test. |

In summary, according to the present invention, a signal processing system (SPS) for a video camera includes first and second subsystem modules, an analog front-end (AFE), and a digital signal processing system (DSPS) connected to the analog front-end (AFE). The signal processing system according to the present invention performs signal processing for a CCD camera capable of capturing full motion video. A complete digital video camera according to the present invention additionally includes a CCD array, a high voltage CCD driver, and a DC-DC converter. The AFE according to the present invention receives mosaic CCD output (a stream of cyan, magenta, yellow and green color samples) from a CCD camera, performs analog signal processing, and produces a 10 bit digital output. The DSPS according to the present invention accepts the digital output of the AFE, performs digital processing on the received digital output of the AFE, and, in turn, outputs a CCIR 601 like 4:2:2 YCrCb video data product according to one embodiment.

The AFE and the DSPS are a cooperative system according to the present invention. Their registers are configured according to the present invention to share the same address spaces, and to an external controller, the combined AFE and DSPS modules appear as a single device. Nonetheless, the AFE and the DSPS according to the present invention can be used as stand-alone systems which can be addressed directly through their respective I2C interfaces.

The combined signal processing system, according to the present invention, is partitioned into physically separate subsystems, respectively including an AFE and a DSPS, respectively fabricated on separate semiconductor substrates to enable the installation of the AFE and its analog functions with a CCD camera package jointly with the CCD imager, and to enable digital data processing to be accomplished either in the camera package itself or separately in a personal computer or other data processing system. Thus, digital and analog signal processing functions are adaptively localizable and delocalizable in accordance with application package requirements. By establishing distributable analog and digital functionalities, the entire CCD signal processing functionality can be localized and fabricated in silicon. Alternatively, the analog functions can be fabricated in silicon while the digital functions can be software implemented. The development of a separate analog and digital modules, according to the present invention, permits convenient retrofitting with advanced analog or digital designs. Further, the analog and digital subsystems are operable at different data rates. Thus, the output of an analog ADC is more than 2× lower than the 4:2:2 YCrCb format output from the digital section. By partitioning into separate modules, the data transmitted from the analog module to the digital module can be provided at a reduced interfacing rate between the analog and digital signal processing domains. According to the present invention, an analog front end provides a CCD interface which is scalable for a plurality of selected CCD output formats and pixel rates. In particular, the timing signals and clocks such as horizontal and vertical shift register clocks, applicable CCD output sampling pulses, and the number of horizontal and vertical pixels per frame are programmable. Further, according to the present invention, the starting pixel type is programmable in a predetermined register.

According to the present invention, a signal processing system (SPS) for an imager device includes a camera system for producing an imager signal, a correlated double sample (CDS) circuit for receiving data from an imager, a variable gain amplifier (VGA), an analog-to-digital converter (ADC) coupled to the VGA circuit, a digital gain circuit (DGC) coupled to the ADC, and an automatic gain control (AGC) circuit for controlling the CDS circuit and the DGC.

According to the present invention, gain control of a signal processing system for an imager device includes a correlated double sampler, a variable gain amplifier circuit for receiving data from the imaging system, and an automatic gain control (AGC) circuit for controlling the level of gain provided to the camera system and a correlated double sampler and variable gain amplifier (CDSVGA) circuit according to the present invention.

According to the present invention, signal processing circuitry for a video camera has first and second data processing subsystems including an analog front-end (AFE) and a digital signal processing system (DSPS) connected to the analog front-end (AFE). The signal processing system according to the present invention performs signal processing function for a low cost CCD or CMOS imaging camera capable of capturing full motion video. A complete digital video camera according to one embodiment of the present invention includes in part a sensor array, a high voltage CCD driver, and a DC-DC converter. The AFE data processing subsystem according to the present invention receives a mosaic CCD output (a stream combining cyan, magenta, yellow and green color samples) from the CCD camera, performs analog signal processing, and produces a digital output which can be converted to a form suitable for image display. The DSPS data processing subsystem according to the present invention accepts the digital output of the AFE data processing subsystem, performs digital processing on the received digital output of the AFE, and according to one embodiment of the present invention outputs a CCIR 601 4:2:2 YCrCb video data product suitable for presentation on a user selected display.

The AFE and DSPS data processing subsystems can be implemented as a cooperative chipset according to the present invention. The respective data processing subsystems include registers which are configured according to the present invention to share a common address space of the respective subsystems. To an external controller, the combined AFE and DSPS subsystems are operable as a unitary data processing system. Additionally, the separate AFE and the DSPS of the respective subsystems according to the present invention can be used as stand-alone units which can be addressed and controlled directly through respective I2C interfaces.

The SPS according to the present invention is thus partitionable into physically separate subsystems which can individually be fabricated on separate semiconductor substrates to enable the combined installation of the AFE and its analog functions in an integrated camera package jointly operable with an imager. This enables digital data processing to be accomplished either in the camera package itself or separately in a personal computer or other data processing system to transform the analog pixel sample into display-ready digital data format. Accordingly, digital and analog signal processing functions are adaptively localizable and delocalizable in accordance with application package requirements. By establishing distributable analog and digital functionalities, the entire imager signal processing functionality can be localized and fabricated in silicon. Alternatively, the analog functions can be fabricated in silicon while the digital functions are software implemented. The development of separate analog and digital modules accordingly permits convenient system retrofitting with advanced analog or digital designs. Further, the analog and digital subsystems are operable at different data rates. Thus, the output of an analog to digital (A/D) converter within the AFE subsystem can be 2× lower than the 4:2:2 YCrCb format output from the digital section according to one embodiment of the present invention. By partitioning the subsystems into separate modules, the data transmitted from the analog module subsystem to the digital module subsystem can be provided at a reduced interfacing load between the analog and digital signal processing domains creating processing efficiencies. According to the present invention, the AFE subsystem provides an imager interface which is scalable for a plurality of selected imager output formats and pixel rates. In particular, the timing signals and clocks such as horizontal and vertical shift register clocks, the applicable imager output sampling pulses, and the number of horizontal and vertical pixels per frame are user programmable according to the present invention.

Further according to the present invention, independent and dependent (through the DSPS) register addressing is enabled and timing generator parameters are programmable. An automatic gain control circuit allows for up to 98 dB of gain range including shutter exposure with an option for flickerless operation that is enabled with a hysteresis method according to the present invention.

What is claimed is:
1. A correlated double sampler and variable gain amplifier (CDSVGA) circuit for receiving CCD data, comprising:
a first fixed capacitor for receiving CCD data;
a first amplifier connected to said first fixed capacitor for amplifying CCD data, said first amplifier connected to said first fixed capacitor;
a first variable capacitor connected in parallel with said first amplifier;
a first switch connected in parallel with said first variable capacitor, said first switch being clocked at a first clock phase;
a second variable capacitor connected to said first amplifier;
a second amplifier connected to said second variable capacitor;
a second fixed capacitor connected in parallel with said second amplifier; and
a second switch connected in parallel with said second fixed amplifier; said second switch being clocked at a second clock phase; and
wherein a total gain of the CDSVGA circuit is a product of a divided value derived from a value of the first fixed capacitor divided by a value of the second fixed capacitor and another divided value derived from a value of the second variable capacitor divided by a value of the first variable capacitor.

2. The correlated double sampler and variable gain amplifier (CDSVGA) circuit according to claim 1, wherein the first switch alternates between open and closed states in accordance with the first clock phase.

3. The correlated double sampler and variable gain amplifier (CDSVGA) circuit according to claim 1, wherein the second switch alternates between open and closed states in accordance with the second clock phase.

4. The correlated double sampler and variable gain amplifier (CDSVGA) circuit according to claim 1, wherein a total gain of the CDS VGA circuit is adjustable by varying values for the first variable capacitor and the second variable capacitor.

5. The correlated double sampler and variable gain amplifier (CDSVGA) circuit according to claim 1, further comprises a two phase non-overlapping clock for performing the correlated double sampling operations.

6. The correlated double sampler and variable gain amplifier (CDSVGA) circuit according to claim 1, wherein the two phase non-overlapping clock allows video signals to be passed to an output while maintaining a positive polarity signal.

7. The correlated double sampler and variable gain amplifier (CDSVGA) circuit according to claim 1, wherein the first fixed capacitor, the first amplifier, the first variable capacitor, and the first switch perform correlated double sampling by sampling a feed-through level across the first fixed capacitor when the first clock phase is high and an amplifier output of the first amplifier follows an input gain in accordance with a divided capacitor value that is derived from a negative of a value of the first fixed capacitor divided by a value of the first variable capacitor when the first clock phase is low.

8. The correlated double sampler and variable gain amplifier (CDSVGA) circuit according to claim 1, wherein the second fixed capacitor, the second amplifier, the second variable capacitor, and the second switch perform correlated double sampling by sampling a feed-through level across the second fixed capacitor when the second clock phase is high and an amplifier output of the second amplifier follows an input gain in accordance with a divided capacitor value that is derived from a negative of a value of the second fixed capacitor divided by a value of the second variable capacitor when the second clock phase is low.

9. The correlated double sampler and variable gain amplifier (CDSVGA) circuit according to claim 8, further comprises a two phase non-overlapping clock for performing the correlated double sampling operations and the second clock phase is controlled by a second phase of the two phase non-overlapping clock, which adds a half clock delay that is effective to maintain a positive output voltage with respect to a reference voltage.

10. A correlated double sampler and variable gain amplifier (CDSVGA) circuit for receiving CCD data, comprising:
   a first fixed capacitor for receiving CCD data;
   a first amplifier connected to said first fixed capacitor for amplifying CCD data, said first amplifier connected to said first fixed capacitor;
   a first variable capacitor connected in parallel with said first amplifier;
   a first switch connected in parallel with said first variable capacitor, said first switch being clocked at a first clock phase;
   a second variable capacitor connected to said first amplifier;
   a second amplifier connected to said second variable capacitor;
   a second fixed capacitor connected in parallel with said second amplifier; and
   a second switch connected in parallel with said second fixed amplifier; said second switch being clocked at a second clock phase; and
   wherein the first fixed capacitor, the first amplifier, the first variable capacitor, and the first switch perform correlated double sampling by sampling a feed-through level across the first fixed capacitor when the first clock phase is high and an amplifier output of the first amplifier follows an input gain in accordance with a divided capacitor value that is derived from a negative of a value of the first fixed capacitor divided by a value of the first variable capacitor when the first clock phase is low.

11. A correlated double sampler and variable gain amplifier (CDSVGA) circuit for receiving CCD data, comprising:
   a first fixed capacitor for receiving CCD data;
   a first amplifier connected to said first fixed capacitor for amplifying CCD data, said first amplifier connected to said first fixed capacitor;
   a first variable capacitor connected in parallel with said first amplifier;
   a first switch connected in parallel with said first variable capacitor, said first switch being clocked at a first clock phase;
   a second variable capacitor connected to said first amplifier;
   a second amplifier connected to said second variable capacitor;
   a second fixed capacitor connected in parallel with said second amplifier; and
   a second switch connected in parallel with said second fixed amplifier; said second switch being clocked at a second clock phase; and
   wherein the second fixed capacitor, the second amplifier, the second variable capacitor, and the second switch perrorm correlated double sampling by sampling a feed-through level across the second fixed capacitor when the second clock phase is high and an amplifier output of the second amplifier follows an input gain in accordance with a divided capacitor value that is derived from a negative of a value of the second fixed capacitor divided by a value of the second variable capacitor when the second clock phase is low.

12. The correlated double sampler and variable gain amplifier (CDSVGA) circuit according to claim 11, further comprises a two phase non-overlapping clock for performing the correlated double sampling operations and the second clock phase is controlled by a second phase of the two phase non-overlapping clock, which adds a half clock delay that is effective to maintain a positive output voltage with respect to a reference voltage.

* * * * *